United States Patent
Tanaka

(10) Patent No.: US 9,601,118 B2
(45) Date of Patent: Mar. 21, 2017

(54) AMUSEMENT SYSTEM

(75) Inventor: Motoyasu Tanaka, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 660 days.

(21) Appl. No.: 13/877,029

(22) PCT Filed: Oct. 6, 2011

(86) PCT No.: PCT/JP2011/073131
§ 371 (c)(1),
(2), (4) Date: Mar. 29, 2013

(87) PCT Pub. No.: WO2012/053371
PCT Pub. Date: Apr. 26, 2012

(65) Prior Publication Data
US 2013/0185069 A1 Jul. 18, 2013

(30) Foreign Application Priority Data

Oct. 20, 2010 (JP) .................................. 2010-235043
Nov. 19, 2010 (JP) .................................. 2010-258707

(51) Int. Cl.
*G10L 15/00* (2013.01)
*G10L 15/26* (2006.01)
(Continued)

(52) U.S. Cl.
CPC ........... *G10L 15/28* (2013.01); *G10H 1/0083* (2013.01); *G10H 1/368* (2013.01); *G10L 15/26* (2013.01);
(Continued)

(58) Field of Classification Search
USPC ........................................ 704/236, 260, 270
See application file for complete search history.

(56) References Cited

U.S. PATENT DOCUMENTS

| | | | | | |
|---|---|---|---|---|---|
| 5,296,643 | A | * | 3/1994 | Kuo ..................... | H04H 60/13 434/307 A |
| 5,465,240 | A | * | 11/1995 | Mankovitz ............. | G09B 5/065 360/48 |

(Continued)

FOREIGN PATENT DOCUMENTS

| | | |
|---|---|---|
| JP | 7 72880 | 3/1995 |
| JP | 09-166992 A | 6/1997 |

(Continued)

OTHER PUBLICATIONS

Written Opinion of the International Searching Authority mailed Dec. 27, 2011; pp. 1-12 (with English translation).

(Continued)

*Primary Examiner* — Olujimi Adesanya
(74) *Attorney, Agent, or Firm* — Oblon, McClelland, Maier & Neustadt, L.L.P.

(57) ABSTRACT

A technique for allowing a virtual experience of more realistic live performance. A main apparatus reproduces music data and audience video data recording a video image of audience. A user holds a microphone and makes a live performance for the audience displayed on a monitor. The microphone sends voice data and motion information of the microphone to the main apparatus. The main apparatus determines that the user makes a live performance when the user calls on the audience with a specific phrase and performs an action corresponding to the specific phrase. The main apparatus reproduces reaction data recording a video image and sound indicating a reaction of the audience to the live performance.

21 Claims, 20 Drawing Sheets

(51) Int. Cl.
- *G10L 21/00* (2013.01)
- *G10L 25/00* (2013.01)
- *G09B 5/00* (2006.01)
- *G10L 15/28* (2013.01)
- *G10H 1/00* (2006.01)
- *G10H 1/36* (2006.01)

(52) U.S. Cl.
CPC ............... *A63F 2300/6063* (2013.01); *G10H 2210/091* (2013.01)

(56) References Cited

U.S. PATENT DOCUMENTS

| | | | | |
|---|---|---|---|---|
| 5,663,514 A | * | 9/1997 | Usa ....................... | G10H 1/0008 84/600 |
| 5,889,224 A | * | 3/1999 | Tanaka ................... | G10H 1/361 434/307 A |
| 6,386,985 B1 | * | 5/2002 | Rackham ................. | A63J 1/00 345/581 |
| 6,645,067 B1 | * | 11/2003 | Okita .................... | A63F 13/005 434/307 A |
| 6,692,259 B2 | * | 2/2004 | Kumar ................... | G10H 1/365 345/630 |
| 7,053,915 B1 | * | 5/2006 | Jung ....................... | G10H 1/368 345/629 |
| 2001/0015123 A1 | * | 8/2001 | Nishitani ................. | G10H 1/00 84/615 |
| 2006/0009979 A1 | * | 1/2006 | McHale ................... | A63F 13/10 704/270 |
| 2009/0038468 A1 | * | 2/2009 | Brennan ................... | G09B 5/06 84/609 |
| 2009/0104956 A1 | * | 4/2009 | Kay ........................ | A63F 13/10 463/7 |
| 2009/0191519 A1 | * | 7/2009 | Wakamoto ............... | G09B 5/04 434/157 |
| 2009/0284950 A1 | * | 11/2009 | Rubio .................... | G10H 1/361 362/86 |
| 2009/0286601 A1 | * | 11/2009 | Rubio .................. | G07F 17/3295 463/36 |
| 2010/0110079 A1 | * | 5/2010 | Kirkendall-Rodriguez ......... | G06Q 30/0204 345/440 |
| 2010/0137049 A1 | * | 6/2010 | Epstein ................... | A63F 13/10 463/7 |
| 2011/0111846 A1 | * | 5/2011 | Ciarrocchi .............. | A63F 13/08 463/30 |
| 2011/0144983 A1 | * | 6/2011 | Salazar .................. | G10H 1/366 704/207 |
| 2011/0319160 A1 | * | 12/2011 | Arn ......................... | A63F 13/10 463/30 |
| 2011/0321074 A1 | * | 12/2011 | Marin .................... | H04H 60/33 725/10 |
| 2012/0120314 A1 | * | 5/2012 | Yang ..................... | H04N 17/004 348/515 |
| 2013/0080348 A1 | * | 3/2013 | Pantaliano ............. | G06Q 30/02 705/347 |
| 2014/0137144 A1 | * | 5/2014 | Jarvenpaa ........... | H04N 21/4667 725/13 |

FOREIGN PATENT DOCUMENTS

| | | |
|---|---|---|
| JP | 10 134611 | 5/1998 |
| JP | 2000-29480 A | 1/2000 |
| JP | 2000 47675 | 2/2000 |
| JP | 2004 287020 | 10/2004 |
| JP | 2004 287362 | 10/2004 |
| JP | 2004287362 A * | 10/2004 |
| JP | 2004 333577 | 11/2004 |
| JP | 2006-47755 A | 2/2006 |
| JP | 2006-325161 A | 11/2006 |
| JP | 2008 10966 | 1/2008 |
| JP | 2011-53276 A | 3/2011 |
| JP | 2011 154289 | 8/2011 |
| JP | 2011203357 A * | 10/2011 |

OTHER PUBLICATIONS

International Search Report Issued Dec. 27, 2011 in PCT/JP11/73131 Filed Oct. 6, 2011.

* cited by examiner

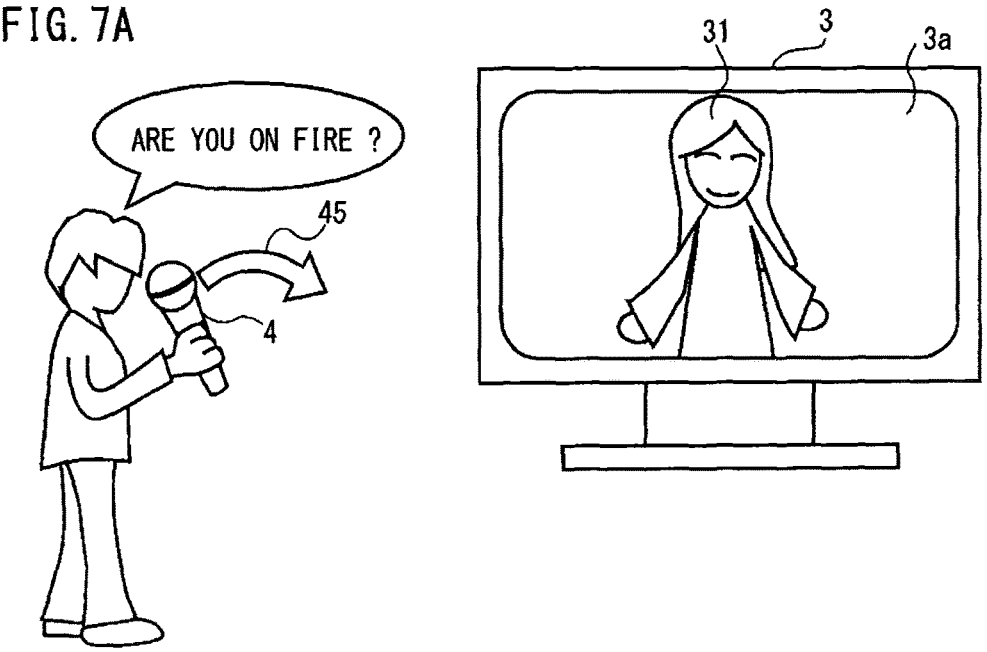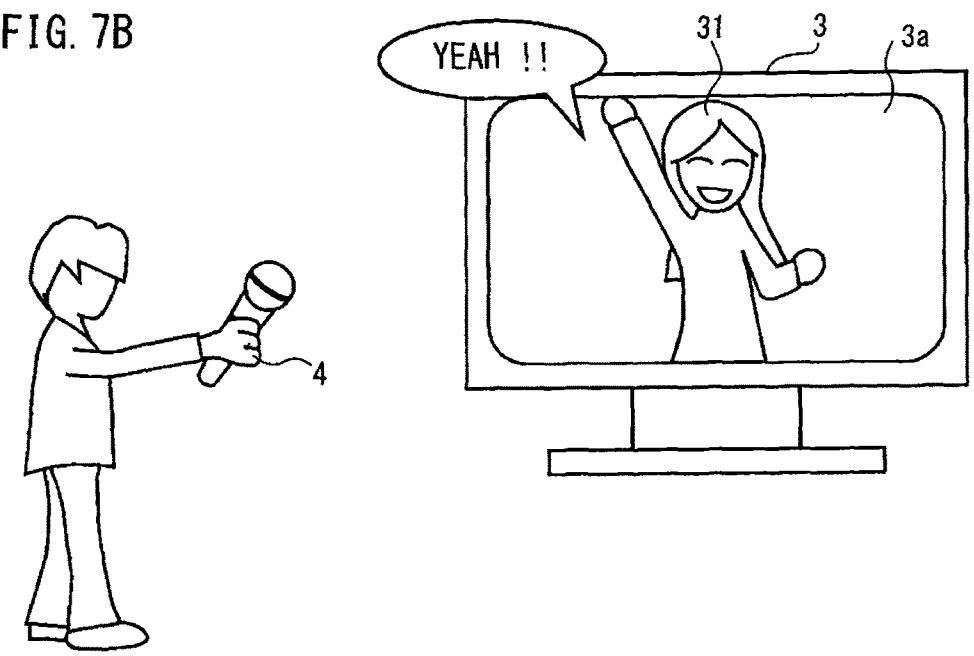

AMUSEMENT SYSTEM

TECHNICAL FIELD

The present invention relates to an amusement system with which a user can sing a song to reproduced music data.

BACKGROUND ART

With karaoke, generally, a user sings a song to selected music. On a monitor of the karaoke, displayed are lyrics of the song selected by the user to the accompaniment of music. Therefore, the user can enjoy the karaoke even if the user does not remember all the lyrics of the selected song. In the background of the lyrics displayed on the monitor, displayed is a video image of a character who sings the song, a video image related to the image of the song, or the like.

In most cases, the karaoke can be enjoyed in a small group of people, such as a family, friends, or the like. An apparatus capable of making sound effects or the like at a timing chosen by a user singing a song in order to liven up the karaoke is disclosed in Patent Document 1.

An electronic percussion device disclosed in Patent Document 1 has a shape of percussion instrument, such as maracas, and comprises an acceleration sensor. The electronic percussion device notifies a user of a timing at which the user can manipulate the device, such as during an interlude of the song or the like, by lighting an LED. When the user shakes the electronic percussion device during the lighting of the LED, percussion sound is reproduced.

A karaoke apparatus capable of shining a spotlight on a user singing a song in order to liven up the karaoke is disclosed in Patent Document 2.

A karaoke apparatus disclosed in Patent Document 2 comprises a transmitter, a karaoke terminal device, and a lighting fixture. The karaoke terminal device reproduces a song selected by a user. The user sings a song, holding a transmitter, to the reproduced music. The transmitter sends an attitude control signal for controlling a direction of radiation of the lighting fixture to the lighting fixture. The lighting fixture changes the direction of radiation to an incoming direction of the attitude control signal.

PRIOR-ART DOCUMENTS

Patent Documents

[Patent Document 1] Japanese Patent Application Laid Open Gazette No. 2004-287020
[Patent Document 2] Japanese Patent Application Laid Open Gazette No. 10-134611

As discussed above, in most cases, the karaoke is enjoyed in a small group of people. Those who listen to the song sung by the user are limited to the family, friends, or the like who take part in the karaoke. In other words, with the karaoke, the user cannot enjoy an experience of being listened by a large audience, like a singer who makes a live performance.

Further, with the karaoke, in most cases, users other than the one singing a song listen the song or look for a song that the user will sing next. In other words, even in a case where the karaoke is enjoyed in a small group of people, all the members in the group cannot enjoy the karaoke. With the karaoke apparatus disclosed in Patent Document 2, it is possible to shine a spotlight on the user singing a song when the user holds the transmitter. The other users who cannot manipulate the light, however, cannot actively take part in the karaoke.

DISCLOSURE OF INVENTION

The present invention is intended for an amusement system. According to an aspect of the present invention, the amusement system comprises a main apparatus, a voice input device held by a user, for outputting voice inputted by the user as voice data, and a voice recognition device for performing a voice recognition process on the voice data, to thereby generate phrase information indicating a phrase that the user says, and in the amusement system of the present invention, the voice input device includes a first motion information output part for outputting first motion information indicating a motion of the voice input device, and the main apparatus includes a reproduction part for reproducing music data selected by the user and audience condition data recording at least one of a video image and sound which indicate the condition of audience, a performance specifying part for specifying a performance of the user on the basis of at least one of the phrase information and the first motion information, and a reaction instruction part for selecting reproduced reaction data corresponding to the specified performance out of a plurality of pieces of reaction data each indicating a reaction of the audience and instructing the reproduction part to reproduce the reproduced reaction data.

According to another aspect of the present invention, the amusement system comprises a main apparatus, a voice input device held by a user, for outputting voice inputted by the user as voice data, an image pickup device for picking up an image of the user to output video data, and a voice recognition device for performing a voice recognition process on the voice data, to thereby generate phrase information indicating a phrase that the user says, and in the amusement system of the present invention, the main apparatus includes a reproduction part for reproducing music data selected by the user and audience condition data recording at least one of a video image and sound which indicate the condition of audience, a video analysis part for analyzing the video data to generate first motion information indicating a motion of the user, a performance specifying part for specifying a performance of the user on the basis of at least one of the phrase information and the first motion information, and a reaction instruction part for selecting reproduced reaction data corresponding to the specified performance out of a plurality of pieces of reaction data each indicating a reaction of the audience and instructing the reproduction part to reproduce the reproduced reaction data.

Since the user can enjoy the karaoke while acting like a singer who makes a live performance for the displayed audience, it is possible to virtually experience more realistic live performance.

According to still another aspect of the present invention, the amusement system comprises a main apparatus for reproducing selected music data, a performance information generation device for generating performance information in accordance with a performance of a first user, and a staging instruction device for generating staging instruction information used for instructing staging of the performance of the first user in accordance with a manipulation of a second user, and in the amusement system of the present invention, the main apparatus includes a performance condition data generation part for generating performance condition data indicating the condition of the performance of the first user on the basis of the music data and the performance information and changing a generation condition of the performance condition data in accordance with the staging instruction information, a staging evaluation part for evaluating a staging content of the performance of the first user with reference to the staging instruction information and instructing the performance condition data generation part to generate reaction data indicating a reaction of audience who views the performance of the first user on the basis of an evaluation result, and a reproduction part for reproducing the performance condition data and the reaction data.

The second user can direct the performance of the first user by manipulating the staging instruction device. Therefore, the second user can enjoy a virtual live performance together with the first user.

It is an object of the present invention to provide an amusement system which allows a virtual experience of more realistic live performance.

It is another object of the present invention to provide an amusement system which allows a user singing a song and the other users to enjoy together.

These and other objects, features, aspects and advantages of the present invention will become more apparent from the following detailed description of the present invention when taken in conjunction with the accompanying drawings.

BRIEF DESCRIPTION OF DRAWINGS

FIG. 7A is a view showing a procedure for exciting the audience in the screen of the monitor shown in FIG. 1;

FIG. 7B is a view showing a procedure for exciting the audience in the screen of the monitor shown in FIG. 1;

BEST MODE FOR CARRYING OUT THE INVENTION

The First Preferred Embodiment

Hereinafter, with reference to figures, the first preferred embodiment of the present invention will be discussed. In the first preferred embodiment, as an example of an amusement system, a karaoke system will be described.

{1. Overall Structure of Karaoke System 100}

Figure 1:
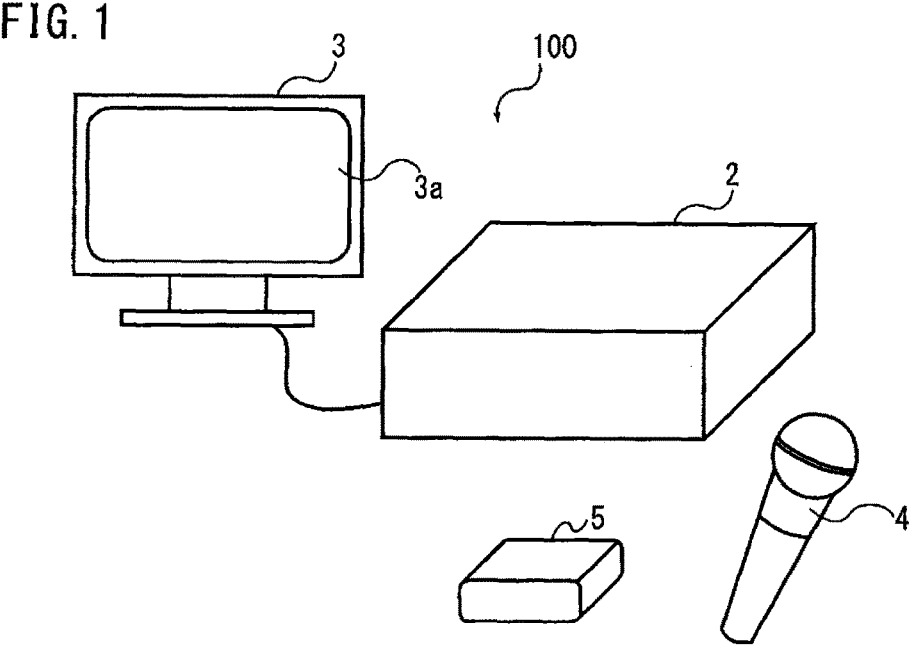
FIG. 1 is a general view showing a karaoke system in accordance with a first preferred embodiment of the present invention.

FIG. 1 is a general view showing a karaoke system 100. The karaoke system 100 comprises a main apparatus 2, a monitor 3, a microphone 4, and a controller 5.

The main apparatus 2 is a processing apparatus for performing a general control of the karaoke system 100, and reproduces music data and video data corresponding to a piece of music selected by a user. The user uses a not-shown remote control to select a song which the user will sing on karaoke.

The monitor 3 is a liquid crystal display or the like and displays thereon a video image outputted from the main apparatus 2. The monitor 3 comprises a not-shown speaker and outputs the music data reproduced by the main apparatus 2 as sound.

The microphone 4 is a voice input device for inputting the user's voice when the user sing a song. The microphone 4 has a motion detection function for detecting a motion of this device and sends motion information indicating the motion of the user to the main apparatus 2.

The controller 5 has a motion detection function for detecting a motion of this device and sends motion information to the main apparatus 2. The user holds the microphone 4 in one hand and holds the controller 5 in the other hand while singing a song. Though the controller 5 has a rectangular parallelepiped shape in an exemplary case of FIG. 1, the controller 5 may have such a shape as to be put around the arm of the user, like a wristband. In this case, it is possible to prevent the user from accidentally dropping the controller 5.

The main apparatus 2 outputs musical performance sound of the song selected by the user and displays a video image recording a scene of a live place crowded with a large audience on the monitor 3. In other words, on the monitor 3, displayed is a video image of the large audience who looks at a singer (user) standing on a stage in the live place.

The user not only sings the selected song but also makes various performances for the audience, such as calling on the audience in the screen 3a through the microphone 4 and directing the microphone 4 toward the audience. The main apparatus 2 detects motions of the both hands of the user on the basis of the motion information transmitted from the microphone 4 and the controller 5. The main apparatus 2 specifies a live performance of the user on the basis of the voice inputted to the microphone 4 and the motion information transmitted from the microphone 4 and the controller 5. A video image representing a reaction of the audience to the specified live performance is displayed on the monitor 3. Thus, since the user can act as a singer who actually makes a live performance in the live place by using the karaoke system 100, the user can virtually experience more realistic live performance.

Figure 2:
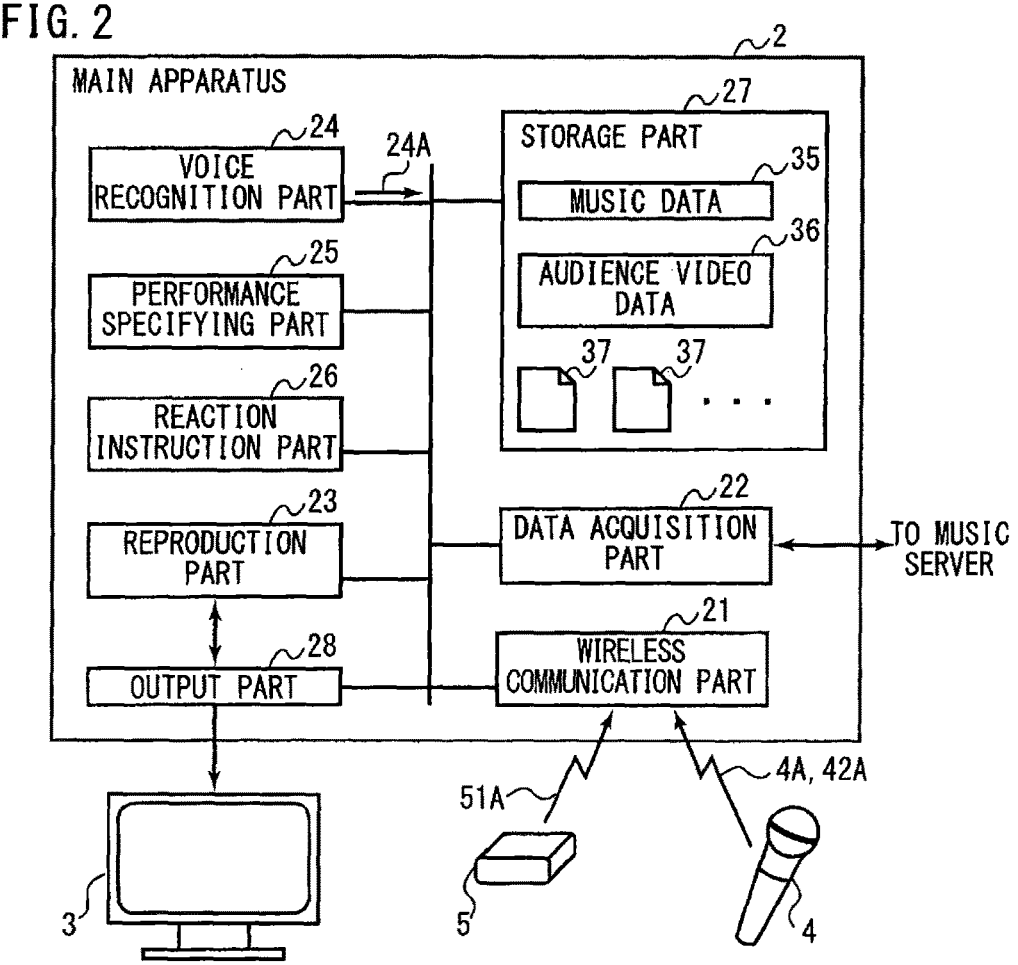
FIG. 2 is a functional block diagram showing a main apparatus shown in FIG. 1.

Next, discussion will be made on a constitution of the main apparatus 2. FIG. 2 is a block diagram showing a functional constitution of the main apparatus 2. The main apparatus 2 comprises a wireless communication part 21, a data acquisition part 22, a reproduction part 23, a voice recognition part 24, a performance specifying part 25, a reaction instruction part 26, a storage part 27, and an output part 28.

The wireless communication part 21 performs wireless communication with the microphone 4 and the controller 5 to acquire pieces of motion information 42A and 51A from the microphone 4 and the controller 5, respectively. The wireless communication can be performed by using Bluetooth (registered trademark), a wireless LAN, infrared communication, or the like.

The data acquisition part 22 acquires music data 35 corresponding to a song selected by the user, audience video data 36, a plurality of pieces of reaction data 37, 37, . . . from a music server (not shown) via the internet or the like. The music data 35 is data recording the musical performance sound of the song selected by the user. The audience video data 36 is audience condition data indicating the condition of a large audience that is present in the live place and data recording a video image and sound of the audience. Herein, the audience refers to people who view and listen the song sung to the music by the user in the live place. The reaction data 37 is data recording a video image and sound indicating a reaction of the audience to the live performance. "sound" refers to a voice of the audience, music representing the condition of the audience, and other types of sound. One piece of reaction data 37 corresponds to any one of a plurality of live performances and also corresponds to any one of reaction levels of the audience. The reaction level will be discussed later in detail.

In the first preferred embodiment, discussion will be made on an exemplary case where the audience video data 36 is used as the audience condition data indicating the condition of the large audience. Voice data indicating the condition of the large audience, however, may be also used. Specifically, instead of the audience video data 36, the voice data recording cheers of the audience or the like may be used.

The reproduction part 23 reproduces the music data 35 and the audience video data 36 which are acquired by the data acquisition part 22. The voice recognition part 24 performs a voice recognition process on the voice data 4A transmitted from the microphone 4 to detect a phrase inputted to the microphone 4 by the user. The voice recognition part 24 outputs phrase information 24A indicating the detected phrase.

The performance specifying part 25 specifies a live performance made by the user on the basis of the phrase information 24A and the pieces of motion information 42A and 51A. The performance specifying part 25 determines that the user makes a live performance when the performance specifying part 25 determines that the phrase information 24A includes a specific phrase (a phrase with which a singer calls on the audience) and the user performs an action corresponding to the specific phrase.

The reaction instruction part 26 determines a reaction level of the audience to the specified live performance. The reaction data 37 indicating a reaction of the audience is selected on the basis of the specified live performance and the reaction level of the audience. The reaction instruction part 26 determines a reproduction condition of the selected reaction data 37 on the basis of the reaction level of the audience. The reproduction condition is volume and/or the like in reproduction of the selected reaction data 37. The reaction instruction part 26 instructs the reproduction part 23 to reproduce the selected reaction data 37 under the determined reproduction condition.

The storage part 27 is a hard disk unit or the like, and stores therein the music data 35, the audience video data 36, and the reaction data 37, 37, . . . which are acquired by the data acquisition part 22. The output part 28 outputs the sound and the video image which are generated by the reproduction part 23 to the monitor 3.

Figure 3:
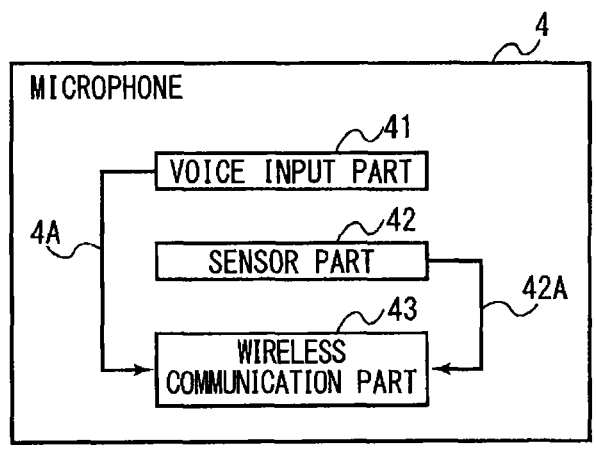
FIG. 3 is a functional block diagram showing a microphone shown in FIG. 1.

Next, discussion will be made on a constitution of the microphone 4. FIG. 3 is a block diagram showing a functional constitution of the microphone 4. The microphone 4 comprises a voice input part 41, a sensor part 42, and a wireless communication part 43.

The voice input part 41 converts the voice given by the user into an electrical signal and outputs the voice data 4A. The sensor part 42 comprises an acceleration sensor for detecting a change of a motion of the microphone 4 and outputs the motion information 42A indicating the motion of the microphone 4. The sensor part 42 may comprise a terrestrial magnetism sensor, a gyroscope, and/or the like besides the acceleration sensor. The wireless communication part 43 performs wireless communication with the main apparatus 2 to transmit the voice data 4A and the motion information 42A to the main apparatus 2.

Figure 4:
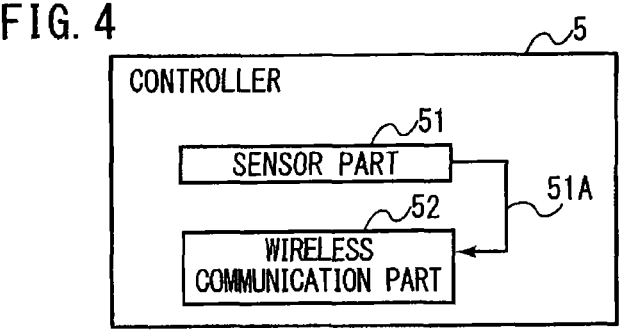
FIG. 4 is a functional block diagram showing a controller shown in FIG. 1.

Next, discussion will be made on a constitution of the controller 5. FIG. 4 is a block diagram showing a functional constitution of the controller 5. The controller 5 comprises a sensor part 51 and a wireless communication part 52. The sensor part 51 comprises an acceleration sensor, like the sensor part 42 in the microphone 4, and outputs the motion information 51A indicating the motion of the controller 5. The wireless communication part 52 performs wireless communication with the main apparatus 2 to transmit the motion information 51A to the main apparatus 2.

Further, the karaoke system 100 may comprise a camera for imaging the motion of the user. In this case, the main apparatus 2 comprises an image analysis part for analyzing the video data to detect the motion of the user. The camera is provided on the monitor 3 and outputs the video data obtained by picking up an image of the user to the main apparatus 2 in real time. The image analysis part analyzes the video data and thereby generates and outputs motion information indicating the motion of the user. The performance specifying part 25 specifies the live performance made by the user on the basis of the phrase information 24A and the motion information outputted from the image analysis part. In this case, the karaoke system 100 does not need to comprise the controller 5, and the microphone 4 does not need to be provided with the sensor part 42.

{2. Operation of Main Apparatus 2}

Hereinafter, discussion will be made on an operation for changing the video image and the sound of the audience outputted from the monitor 3 in accordance with the live performance of the user, centering on an operation of the main apparatus 2. The following discussion will be made on an exemplary case where the pieces of motion information 42A and 51A transmitted from the microphone 4 and the controller 5, respectively, are used. Even in the case where the camera is used to detect the motion of the user, the same operation is performed.

Figure 5:
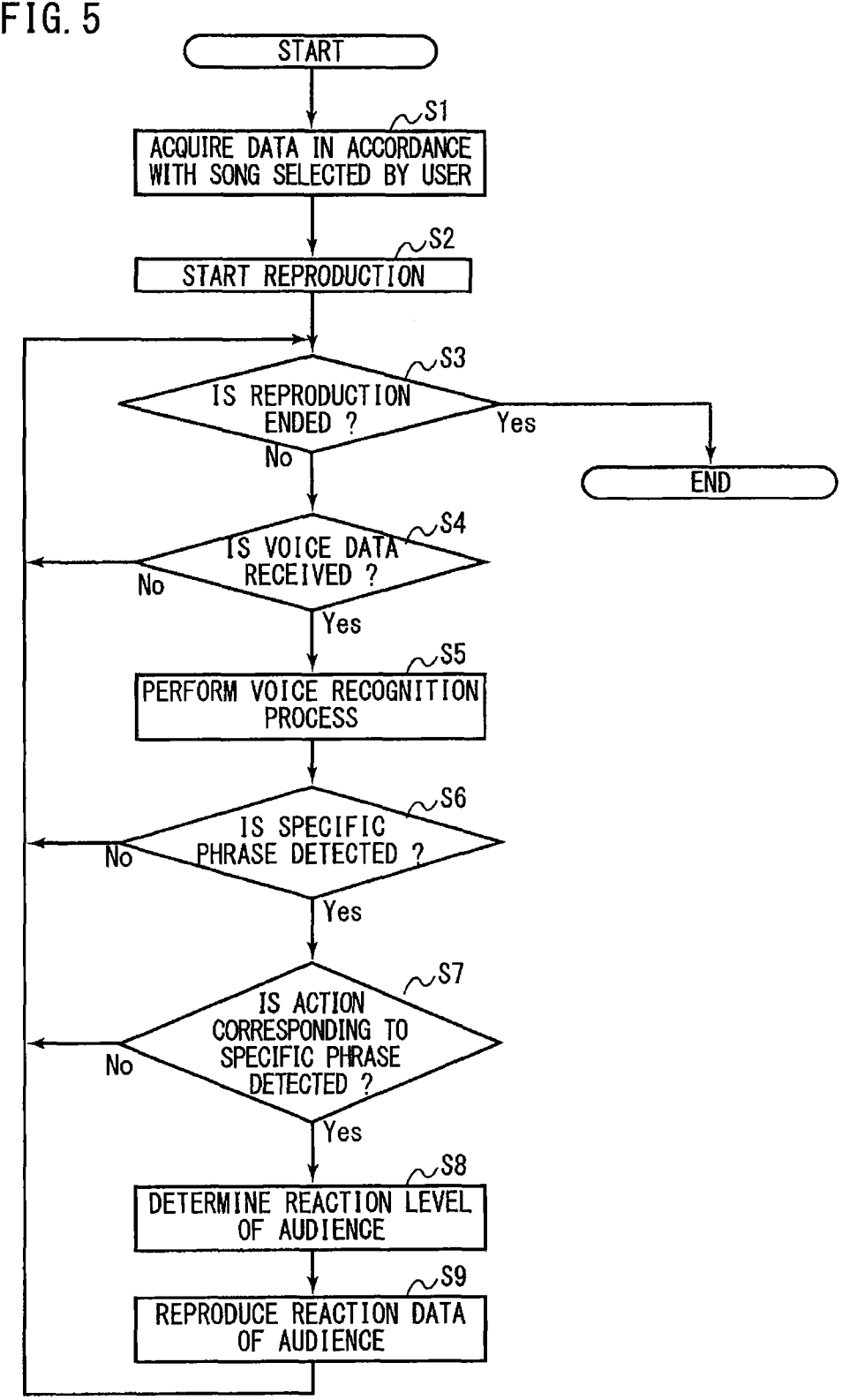
FIG. 5 is a flowchart showing an operation flow of the main apparatus shown in FIG. 1.

FIG. 5 is a flowchart showing the operation of the main apparatus 2. First, the user selects a song that the user wants to sing by manipulating a now-shown remote control. The data acquisition part 22 acquires the music data 35 corresponding to the song selected by the user, the audience video data 36, and the pieces of reaction data 37, 37, ... from the music server and stores these data into the storage part 27 (Step S1).

The reproduction part 23 starts reproduction of the music data 35 and the audience video data 36 (Step S2). The musical performance sound of the song selected by the user and the video image and the cheer of the audience who enjoys the live performance in the live place are thereby outputted from the monitor 3.

Figure 6:
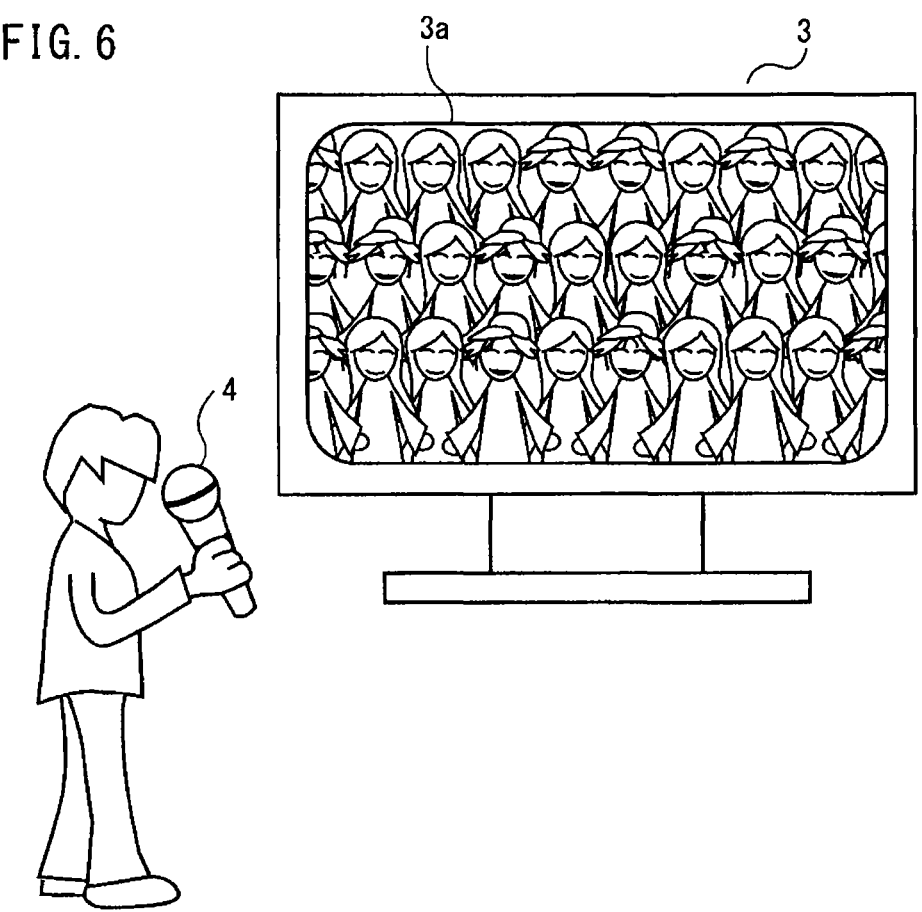
FIG. 6 is a view showing a video image of audience displayed on a screen of a monitor shown in FIG. 1.

FIG. 6 is a view showing the monitor 3 displaying a video image of a large audience. When the user stands in front of the monitor 3 in which the video image of the large audience is displayed on a screen 3a thereof, the user can confront the large audience in the screen 3a. The user makes a virtual live performance for the audience shown in the monitor 3. In other words, the user can make various live performances while singing songs as a singer who performs a live event.

The main apparatus 2 repeatedly executes the operations of Steps S4 to S9 until the reproduction of the music data 35 is ended ("Yes" in Step S3).

The microphone 4 sends a voice phrase inputted to the voice input part 41 as the voice data 4A to the main apparatus 2 in real time. When the main apparatus 2 receives the voice data 4A ("Yes" in Step S4), the voice recognition part 24 performs a voice recognition process on the voice data 4A (Step S5). The voice recognition part 24 outputs the phrase information 24A recording the voice phrase given by the user. The performance specifying part 25 determines whether or not the user calls on the audience in the screen 3a with a specific phrase on the basis of the phrase information 24A (Step S6).

When the phrase information 24A does not include any specific phrase ("No" in Step S6), the voice inputted to the microphone 4 is determined as a singing voice of the user. The operation of the main apparatus 2 goes back to Step S3. On the other hand, when the phrase information 24A includes a specific phrase ("Yes" in Step S6), the performance specifying part 25 determines that the user calls on the audience with a specific phrase. Then, the performance specifying part 25 determines whether or not the user performs an action corresponding to the specific phrase on the basis of the pieces of motion information 42A and 51A.

The microphone 4 sends the motion information 42A outputted from the sensor part 42 to the main apparatus 2 in real time. Similarly, the controller 5 sends the motion information 51A outputted from the sensor part 51 to the main apparatus 2 in real time. The performance specifying part 25 determines whether or not the user performs an action corresponding to the specific phrase on the basis of the pieces of motion information 42A and 51A (Step S7).

When any action corresponding to the specific phrase is not detected ("No" in Step S7), the operation of the main apparatus 2 goes back to Step S3.

When an action corresponding to the specific phrase is detected ("Yes" in Step S7), the performance specifying part 25 determines that user makes a live performance for the audience in the screen 3a. Among the live performances made by the user are those for exciting the audience, for leading the audience to sing along, for leading audience to clap, and the like.

The reaction instruction part 26 determines the reaction level of the audience to the live performance of the user by using the phrase information 24A and the pieces of motion information 42A and 51A (Step S8). The reaction instruction part 26 selects reaction data 37 on the basis of the live performance made by the user and the reaction level. When the reaction level is high, for example, the reaction instruction part 26 selects reaction data 37 recording a video image in which all the audience reacts to the live performance of the user.

The reaction instruction part 26 instructs the reproduction part 23 to reproduce the selected reaction data 37. The reproduction part 23 reproduces the indicated reaction data 37 together with the music data 35 being reproduced (Step S9). As a result, the reaction of the audience to the live performance of the user is displayed on the screen 3a and the musical performance sound of the song and the cheer of the audience are outputted overlappingly from the monitor 3.

The reaction instruction part 26 may change the reproduction condition of the reaction data 37 in accordance with the reaction level. When the reaction level is high, for example, the volume of the cheer of the audience may be increased. When the reaction level is low, the volume of the cheer of the audience may be decreased or the reproduction speed of the data recording the cheer of the audience may be decreased.

In the flowchart of FIG. 5, after detecting the specific phrase from the voice data 4A, it is determined whether or not any action corresponding to the detected specific phrase is performed. Depending on the type of the live performance, however, the order of executing Steps S4 to S6 and Step S7 (detection of an action) may be changed. Further, on the basis of either one of the specific phrase and the motion of the user, the live performance of the user may be specified.

Though the case have been discussed where the audience video data 36 and the reaction data 37 are different from each other in the first preferred embodiment, this is only one exemplary case. For example, each person in the audience in the audience video data 36 may be made an object. In this case, the main apparatus 2 changes the motion of each audience object on the basis of the specified live performance and the reaction level. The main apparatus 2 may change, for example, the motion or the cheer of each audience object as a reaction of the audience to the specified live performance. Further, the reaction instruction part 26 may change the ratio of audience objects which react to the live performance of the user in accordance with the reaction level.

{3. Specific Examples of Live Performances}

Hereinafter, discussion will be made on specific examples of live performances that the main apparatus 2 can detect.

{3.1. Exciting of Audience}

FIGS. 7A and 7B are views showing a procedure in which the user excites the audience 31 in the screen 3a. In FIGS. 7A and 7B, for easy understanding of the motion of the audience 31 in the screen 3a, only one person 31 among the audience is displayed on the screen 3a. In an actual case, when the reproduction part 23 reproduces the audience video data 36, the live place and the large audience 31 in the live place are displayed on the screen 3a. In FIGS. 7A and 7B, the main apparatus 2 and the controller 5 are not shown.

Exciting the audience is a live performance in which a singer performing a live event calls on the audience with a phrase in a question form and the audience answers the singer in unison. The user can excite the audience while the intro or the interlude of the song is reproduced.

In order to specify the live performance of exciting the audience, the main apparatus 2 uses the voice data 4A and the motion information 42A transmitted from the microphone 4 and does not use the motion information 51A transmitted from the controller 5.

In order to specify the live performance of exciting the audience, the main apparatus 2 first detects a specific phrase. As shown in FIG. 7A, Directing the microphone 4 to the user himself/herself, the user inputs a specific phrase in a question form (hereinafter, referred to as a "phrase for exciting"), for example, "Are you on fire?" into the microphone 4. The microphone 4 sends the phrase for exciting to the main apparatus 2 as the voice data 4A.

The voice recognition part 24 performs a voice recognition process on the received voice data 41A (Step S5), to thereby generate the phrase information 24A. In the performance specifying part 25, set are various phrases with which the singer calls on the audience in the live performance. The performance specifying part 25 compares the phrase information 24a with the phrases set therein, to thereby determine that the user calls on the audience with the phrase for exciting ("Yes" in Step S6).

After the user inputs the phrase for exciting into the microphone 4 which is directed to the user, the user changes the direction of the microphone 4 from the user to the screen 3a. In other words, the user reverses the direction of the microphone 4 as indicated by the arrow 45 (see FIG. 7A). The sensor part 42 of the microphone 4 generates the motion information 42A in accordance with the motion of the user. On the basis of the motion information 42A transmitted from the microphone 4, the performance specifying part 25 determines that the direction of the microphone 4 is reversed. The performance specifying part 25 determines that the user makes a live performance of exciting the audience, from the input of the phrase for exciting into the microphone 4 ("Yes" in Step S6) and the reverse in direction of the microphone 4 ("Yes" in Step S7).

The reaction instruction part 26 determines the reaction level of the audience to the live performance of exciting the audience made by the user (Step S8). The reaction instruction part 26 determines the reaction level on the basis of a time difference (detection time difference) between a voice input timing when the phrase for exciting is inputted and a motion detection timing when the reverse in direction of the microphone is detected. The voice input timing is included in the phrase information 24A. The motion detection timing is included in the motion information 42A.

In the reaction instruction part 26, set is a time difference (ideal time difference) between the voice detection timing and the motion detection timing, for the maximum reaction level. The reaction instruction part 26 determines the reaction level on the basis of the magnitude of the lag between the ideal time difference and the detection time difference. When the lag is small, for example, the reaction instruction part 26 determines that the live performance of exciting the audience has been smoothly made and makes the reaction level high. On the other hand, when the lag is large, such as in the case where the timing for reversing the direction of the microphone is delayed or the like, the reaction to the phrase for exciting may vary. In such a case, the reaction level decreases. Further, the reaction instruction part 26 may determine the reaction level in consideration of the position in the reproduction of the music data 35, in which the user makes the live performance of exciting the audience.

The reaction instruction part 26 selects the reaction data 37 for the live performance of exciting the audience out of pieces of reaction data 37, 37, . . . stored in the storage part 27 on the basis of the determined reaction level. When the reaction level is high, selected is the reaction data 37 recording a video image in which all the audience performs a reaction to the live performance of exciting the audience. When the reaction level is low, selected is the reaction data 37 recording a video image in which only a small number of persons in the audience perform a reaction to the live performance of exciting the audience.

The reaction instruction part 26 instructs the reproduction part 23 to reproduce the selected reaction data 37. At that time, the reaction instruction part 26 also notifies the reproduction part 23 of the reproduction condition of the selected reaction data 37. The reproduction condition is determined on the basis of the reaction level for the live performance of exciting the audience. When the reaction level is high, for example, the volume during the reproduction of the reaction data 37 is made high. When the reaction level is low, the volume during the reproduction of the reaction data 37 is made low and/or the reproduction speed of the cheer of the audience is made slow.

The reproduction part 23 reproduces the reaction data 37 indicated by the reaction instruction part 26, to the music data being reproduced (Step S9). As a result, as shown in FIG. 7B, as the reaction of the audience to the live performance of exciting the audience, an image in which the person 31 in the audience in the screen 3a raises her right arm is displayed on the screen 3a and the cheer of the audience saying "Yeah!" is reproduced. In an actual case, since an image in which the large audience performs a reaction in unison to the live performance of exciting the audience is displayed on the screen 3a, the user can virtually enjoy the live performance in the live place. Since the reaction of the audience 31 in the live place is significantly changed depending on the way the user excites the audience, the user can enjoy the same sense of tension as that of the singer who actually makes a live performance.

{3.2. Leading of Singing Along}

Figure 8A:
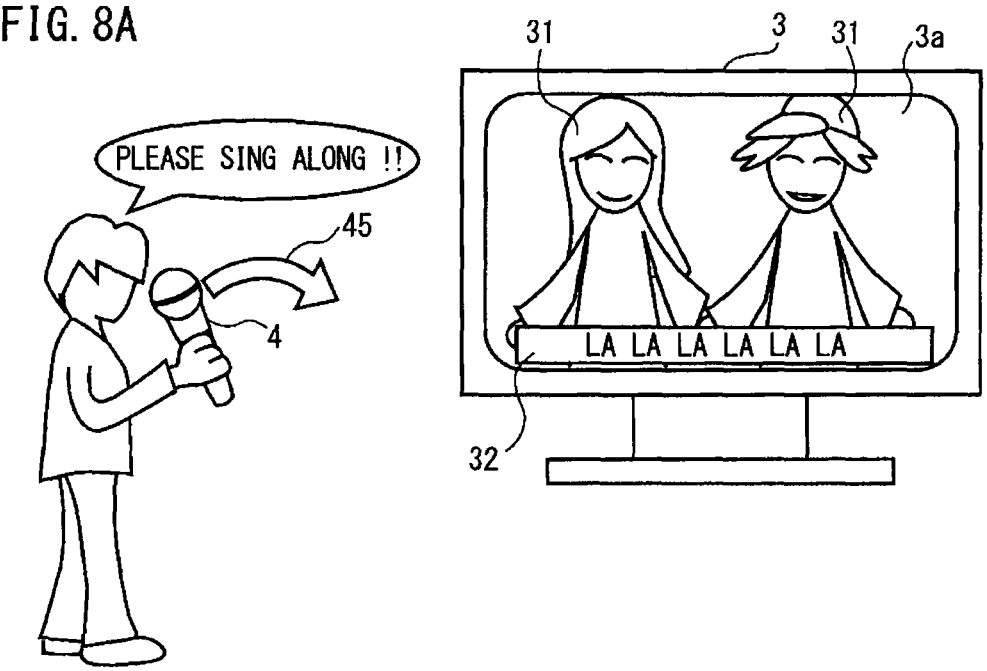
FIG. 8A is a view showing a procedure for leading the audience in the screen of the monitor shown in FIG. 1 to sing along.
Figure 8B:
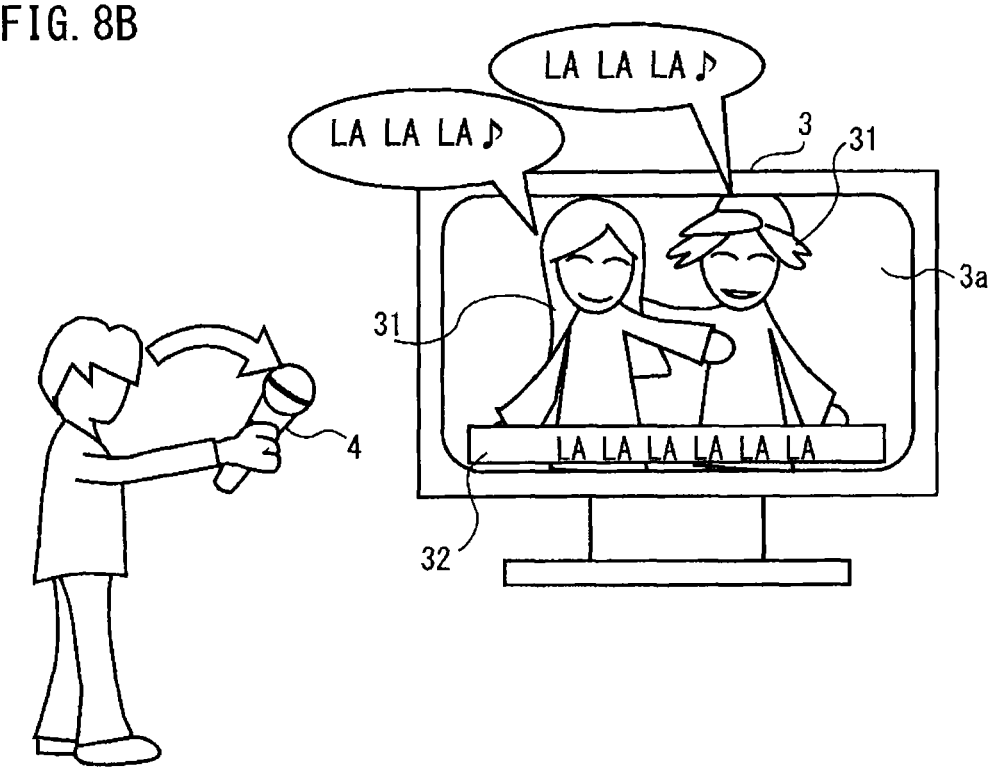
FIG. 8B is a view showing a procedure for leading the audience in the screen of the monitor shown in FIG. 1 to sing along.

The user can lead the audience in the screen 3a to sing along the song sung by the user as a live performance. FIGS. 8A and 8B are views showing a procedure in which the user leads the audience to sing along.

Like in FIG. 7A, in FIGS. 8A and 8B, for easy understanding of the motion of the audience in the screen 3a, shown are only two persons 31 and 31 in the audience. In FIGS. 8A and 8B, the main apparatus 2 and the controller 5 are not shown.

In order to determine that the live performance for leading the audience to sing along is made, the main apparatus 2 uses the voice data 4A and the motion information 42A transmitted from the microphone 4. The motion information 51A transmitted from the controller 5 is not used for the determination on the live performance for leading of sing-along.

As shown in FIG. 8A, during the reproduction of the music data 35, the video image of the audience in the live place and the lyrics 32 of the reproduced song are displayed on the screen 3a. The lyrics 32 corresponding to a part of the reproduced song that the audience can sing along (for example, an impressive melody line of the song) is displayed, being enclosed by a rectangular frame. With this, the user can know the timing of leading the audience to sing along.

In order to specify the live performance of leading the audience to sing along, the main apparatus 2 first detects a voice phrase that the user calls on the audience to sing along (hereinafter, referred to as a "sing-along phrase"). Directing the microphone 4 to the user himself/herself, the user inputs a sing-along phrase, for example, "Please sing along!" into the microphone 4. The microphone 4 sends the inputted sing-along phrase to the main apparatus 2 as the voice data 4A. In the same procedure as discussed above, the performance specifying part 25 determines that the user calls on the audience with the sing-along phrase ("Yes" in Step S6).

After inputting the sing-along phrase into the microphone 4, the user reverses the direction of the microphone 4 to the screen 3a (the direction indicated by the arrow 45). The performance specifying part 25 determines that the direction of the microphone 4 is reversed on the basis of the motion information 42A transmitted from the microphone 4. The performance specifying part 25 determines that the user makes a live performance of leading the audience to sing along, from the input of the sing-along phrase into the microphone 4 and the reverse in direction of the microphone 4 ("Yes" in Step S7).

The reaction instruction part 26 determines the reaction level of the audience for the live performance of leading the audience to sing along, which is made by the user. Since the procedure for determining the reaction level is the same as discussed above, the discussion thereon will be omitted.

The reaction instruction part 26 instructs reproduction of the reaction data 37 corresponding to the determined reaction level out of the pieces of reaction data 37, 37, . . . for sing-along by the audience. The reaction instruction part 26 also notifies the reproduction part 23 of the reproduction condition of the reaction data 37. The number of persons to sing along in the audience and the sing-along volume are thereby changed in accordance with the reaction level. As shown in FIG. 8B, displayed is a scene in which the persons 31 and 31 in the audience in the screen 3a sing along with their arms around each other's shoulders, as a reaction to the request for sing-along by the user. Further, the singing voice of the audience corresponding to the lyrics that the user leads the audience to sing along is outputted from the monitor 3. In an actual case, since a scene in which the large audience sings along in unison is displayed on the screen 3a, the user can virtually enjoy the live performance of singing along with the audience in the live place.

The sing-along of the audience continues until the user moves the microphone 4. In order to stop the sing-along of the audience, the user reverses the direction of the microphone 4 from the screen 3a to the user himself/herself. The performance specifying part 25 determines that leading of the sin-along is stopped when the direction of the microphone 4 is reversed during the reproduction of the reaction data 37. The reproduction of the music data 35 and the audience video data 36 is thereby restarted.

{3.3. Leading of Handclaps}

Figure 9A:
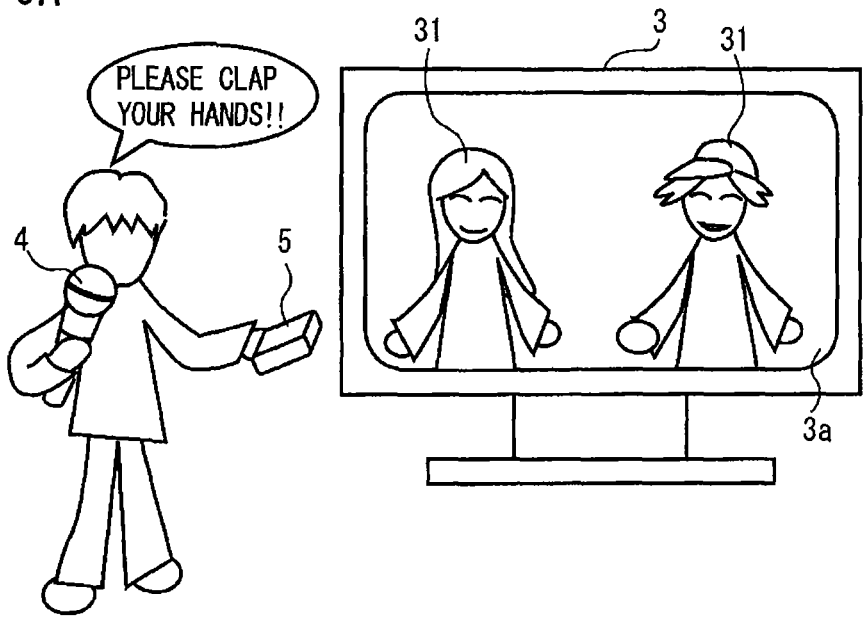
FIG. 9A is a view showing a procedure for leading the audience in the screen of the monitor shown in FIG. 1 to clap.
Figure 9B:
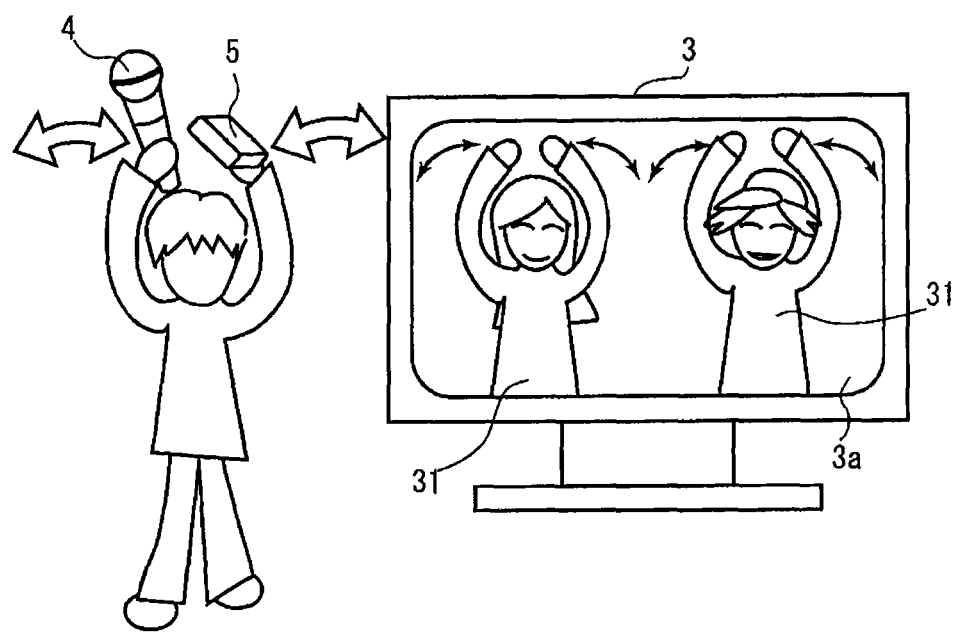
FIG. 9B is a view showing a procedure for leading the audience in the screen of the monitor shown in FIG. 1 to clap.

The user can perform an action to lead the audience 31 in the screen 3a to clap, as a live performance. FIGS. 9A and 9B are views showing a procedure in which the user leads the persons 31 and 31 in the audience in the screen 3a to clap.

Like in FIG. 7A, in FIGS. 9A and 9B, for easy understanding of the motion of the audience 31 in the screen 3a, shown are only two persons 31 and 31 in the audience. In FIGS. 9A and 9B, the main apparatus 2 is not shown. In order to detect that the live performance for leading the audience to clap is made, the main apparatus 2 uses the voice data 4A and the motion information 42A transmitted from the microphone 4 and the motion information 51A transmitted from the controller 5.

As shown in FIG. 9A, during the reproduction of the music data 35, the user can lead the audience to clap, as a live performance. In order to detect the live performance of leading the audience to clap, the main apparatus 2 first detects a voice phrase for leading the audience to clap (hereinafter, referred to as a "handclap phrase") ("Yes" in Step S6).

Specifically, the user inputs a handclap phrase into the microphone 4. The handclap phrase is, for example, "Please clap your hands!!". The microphone 4 sends the inputted handclap phrase to the main apparatus 2 as the voice data 4A. In the same procedure as discussed above, the performance specifying part 25 determines that the user calls on the audience in the screen 3a with the handclap phrase.

After inputting the handclap phrase into the microphone 4, the user performs an action to lead the audience to clap their hands. As shown in FIG. 9B, the user claps his/her hands to the rhythm of the musical performance sound of the song (the reproduced music data 35). Since the user holds the microphone 4 in his/her right hand and holds the controller 5 in his/her left hand, the microphone 4 and the controller 5 send the pieces of motion information 42A and 51A, respectively, indicating the motion of handclaps to the main apparatus 2.

The performance specifying part 25 detects the motion of both hands of the user on the basis of the pieces of received motion information 42A and 51A. When the microphone 4 and the controller 5 repeatedly move from side to side and the direction in which the microphone 4 moves and the direction in which the controller 5 moves are opposite to each other, for example, the performance specifying part 25 can determine that the user performs handclaps ("Yes" in Step S7). In other words, the performance specifying part 25 determines that user leads the audience to clap by detecting the handclap phrase and the motion of handclaps.

The reaction instruction part 26 determines the reaction level of the audience on the basis of the timing of detecting the handclap phrase and the timing of detecting the motion of handclaps (Step S8). The procedure for determining the reaction level is basically the same as that for determining the reaction level for the live performance of exciting the audience. Further, the reaction instruction part 26 may calculate the rhythm of the handclaps of the user by using the pieces of motion information 42A and 51A. The reaction instruction part 26 may determine the reaction level on the basis of the calculated rhythm. For example, The reaction instruction part 26 can detect the lag between the rhythm of the musical performance sound of the song and the rhythm of the handclaps of the user and make the reaction level higher as the detected lag is smaller.

The reaction instruction part 26 instructs reproduction of the reaction data 37 corresponding to the determined reaction level out of the pieces of reaction data 37, 37, . . . for handclaps of the audience. The reaction instruction part 26 also notifies the reproduction part 23 of the reproduction condition of the reaction data 37. Since the reaction data 37 recording a video image in which the persons in the audience clap their hands is thereby reproduced together with the music data 35 (Step S9), as shown in FIG. 9B, the video image in which the persons 31 and 31 in the audience in the screen 3a clap their hands over their heads is displayed. The ratio of the persons who clap their hands to all the persons in the audience displayed on the screen 3a is changed in accordance with the reaction level. Further, the volume of the handclaps is changed in accordance with the reproduction condition determined on the basis of the reaction level.

Thus, since the video image in which the persons 31 and 31 in the audience in the screen 3a clap their hands to the user's motion of clapping his/her hands is displayed, the user can virtually enjoy the live performance of performing handclaps together with the audience in the live place.

{3.4. Leading of Waving (Action of Waving Both Hands Wildly)}

Figure 10A:
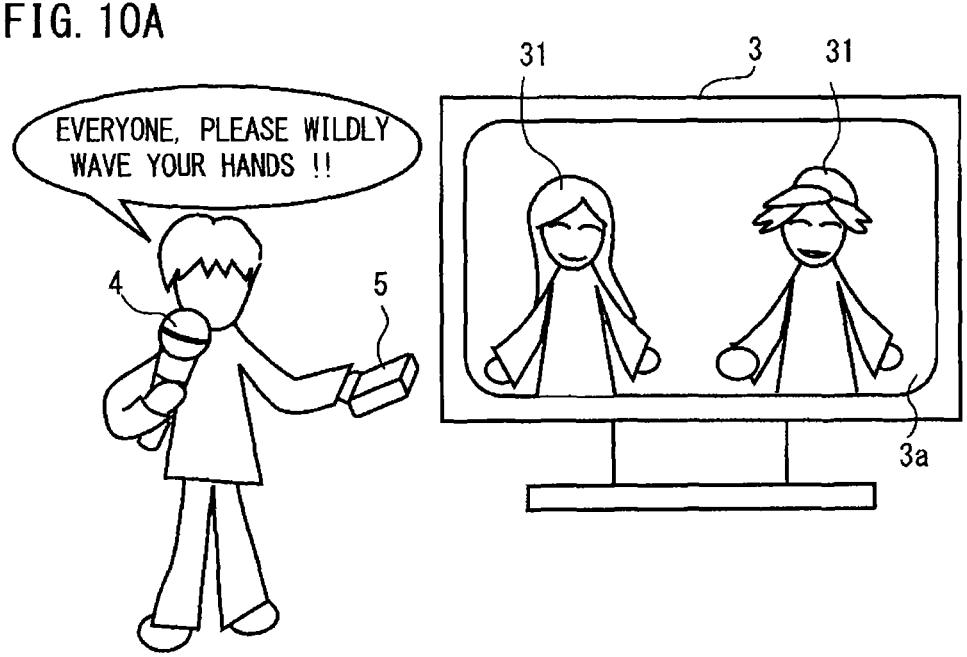
FIG. 10A is a view showing a procedure for leading the audience in the screen of the monitor shown in FIG. 1 to wave both arms wildly.
Figure 10B:
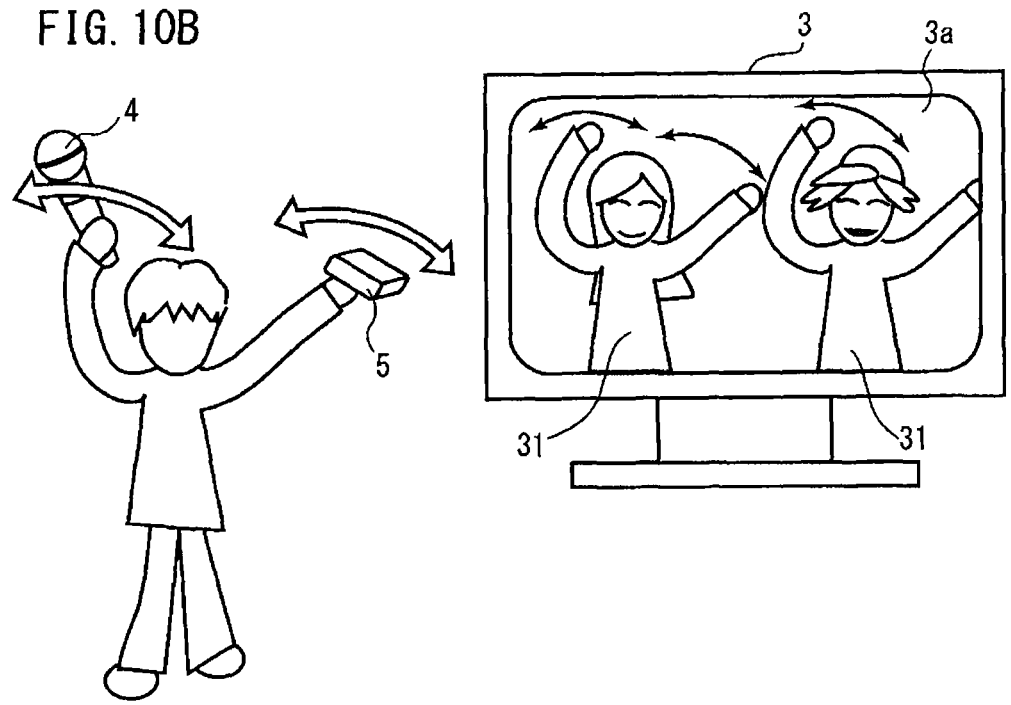
FIG. 10B is a view showing a procedure for leading the audience in the screen of the monitor shown in FIG. 1 to wave both arms wildly.

The user can perform an action to lead the audience in the screen 3a to wave, as a live performance. To wave, the persons in the audience in the live place wildly wave both their hands from side to side to the song lively played. FIGS. 10A and 10B are views showing a procedure in which the user leads the audience to wave.

Like in FIG. 9A, in FIGS. 10A and 10B, for easy understanding of the motion of the audience in the screen 3a, shown are only two persons 31 and 31 in the audience. In FIGS. 10A and 10B, the main apparatus 2 is not shown. In order to detect the live performance of leading the audience to wave, the main apparatus 2 uses the voice data 4A and the motion information 42A transmitted from the microphone 4 and the motion information 51A transmitted from the controller 5.

As shown in FIG. 10A, during the reproduction of the music data 35, the user can lead the audience to wave, as a live performance. In order to detect the live performance of leading the audience to wave, the main apparatus 2 first detects a voice phrase for leading the audience to wave (hereinafter, referred to as a "wave phrase").

Specifically, the user inputs a wave phrase into the microphone 4. The wave phrase is, for example, "Everyone, please wildly wave your arms!!". The microphone 4 sends the inputted wave phrase to the main apparatus 2 as the voice data 4A. In the same procedure as discussed above, the performance specifying part 25 determines that the user calls on the audience in the screen 3a with the wave phrase ("Yes" in the Step S6).

After inputting the wave phrase into the microphone 4, the user performs an action of waving his/her arms. As shown in FIG. 10B, the user waves his/her arms wildly over his/her head to the rhythm of the musical performance sound of the song (the reproduced music data 35). Since the user holds the microphone 4 in his/her right hand and holds the controller 5 in his/her left hand, the microphone 4 and the controller 5 send the pieces of motion information 42A and 51A, respectively, indicating the motion of waving to the main apparatus 2.

The performance specifying part 25 detects the motion of both arms of the user on the basis of the pieces of received motion information 42A and 51A. When the microphone 4 and the controller 5 repeatedly move wildly from side to side and the microphone 4 and the controller 5 move in the same direction, for example, the performance specifying part 25 can determine that the user performs the action of waving.

When it is determined that the user leads the audience to wave ("Yes" in the Step S7), the reaction instruction part 26 determines the reaction level of the audience (Step S8). The reaction level is determined on the basis of the rhythm in which the user waves his/her arms. The reaction instruction part 26 can detect the lag between the rhythm of the musical performance sound of the song and the rhythm of the waving of the user and make the reaction level higher as the detected lag is smaller.

The reaction instruction part 26 instructs reproduction of the reaction data 37 corresponding to the determined reaction level out of the pieces of reaction data 37, 37, . . . for waving of the audience. The reproduction part 23 reproduces the reaction data 37 recording a video image in which the persons in the audience wave, together with the music data 35 (Step S9). As a result, as shown in FIG. 10B, the video image in which the persons 31 and 31 in the audience in the screen 3a wave both their arms over their heads is displayed. The ratio of the persons who wave to all the persons in the audience displayed on the screen 3a is changed in accordance with the reaction level.

When the user lead the audience to clap or wave as a live performance, the user may not call on the audience in the screen 3a with the handclap phrase or the wave phrase. Even when the main apparatus 2 detects only the user's action of handclaps and does not detect the handclap phrase, for example, the main apparatus 2 may reproduce the reaction data 37 for handclaps of the audience.

The user may lead the audience to clap or wave by using only the microphone 4, without using the controller 5. The performance specifying part 25 may determine that the user leads audience to clap or wave when the microphone 4 repeatedly moves from side to side. At that time, the difference between the handclaps and the waving may be determined on the basis of the degree to which the user moves the microphone 4 from side to side.

{3.5. Entry and Leave}

The user can virtually enter or leave the live place displayed on the screen 3a, as a live performance.

Figures 11, 12:
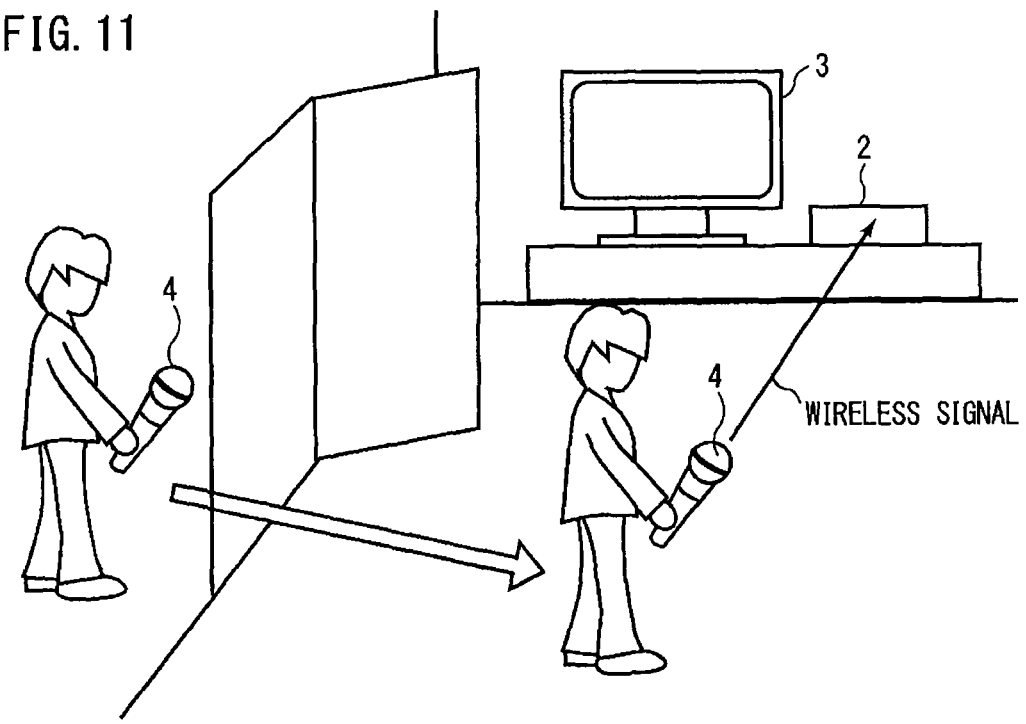
FIG. 11 is a view showing a motion of a user who uses the karaoke system shown in FIG. 1.
FIG. 12 is a view showing a setting screen displayed on the monitor shown in FIG. 1.

First, discussion will be made on a case where the user virtually enters the live place. FIG. 11 is a view showing a procedure in which the user virtually enters the live place. The performance specifying part 25 detects the motion of the user on the basis of whether or not there is a wireless signal from the microphone 4, instead of the pieces of motion information 42A and 51A.

Before starting the reproduction of the music data 35, the user waits outside a room where the main apparatus 2 is set up. At that time, the wireless communication part 21 of the main apparatus 2 cannot detect a wireless signal transmitted from the microphone 4.

After starting the reproduction of the music data 35, the user holding the microphone 4 enters the room where the karaoke system 100 is set up. When the user is in the room, the wireless communication part 21 can detect a wireless signal transmitted from the microphone 4. When the wireless signal transmitted from the microphone 4 is detected after the reproduction of the music data 35 is started, the performance specifying part 25 determines that the user enters the live place.

When it is determined that the user enters the live place, the reaction instruction part 26 determines the reaction level of the audience. The reaction instruction part 26 determines the reaction level of the audience on the basis of the timing of detecting the wireless signal transmitted from the microphone 4.

The reaction instruction part 26 instructs the reproduction part 23 to reproduce the reaction data 37 indicating the reaction of the audience to the entry of the singer. At that time, the reaction instruction part 26 also notifies the reproduction part 23 of the reproduction condition of the reaction data 37. The reproduction part 23 reproduces the reaction data 37 recording a video image in which the audience considerably livens up when the user enters the live place and a loud cheer of the audience. The volume of the cheer of the audience is changed in accordance with the reaction level.

Next, discussion will be made on a case where the user leaves the live place. In order for the user to virtually leave the live place, the user goes out of the room while holding the microphone 4. When the wireless communication part 21 cannot detect the wireless signal transmitted from the microphone 4, the performance specifying part 25 determines that the user leaves the live place.

When it is determined that the user leaves the live place, the reaction instruction part 26 determines the reaction level of the audience. The reaction instruction part 26 determines the reaction level of the audience when the user leaves the live place on the basis of the timing when the user leaves the live place or the reaction level to the live performance made until the user leaves the live place. When the reaction level is high, the reaction instruction part 26 instructs the reproduction part 23 to reproduce the reaction data 37 recording a video image in which the audience calls for an encore. On the other hand, when the reaction level is low, the reaction instruction part 26 can instruct the reproduction part 23 to reduce the volume of the cheer of the audience or instruct the reproduction part 23 to reproduce the reaction data 37 recording a video image in which booing arises from the audience.

Further, the microphone 4 may be provided with a switch used for notifying the main apparatus 2 of the entry or leave of the user. In such a case, when an entry switch is pressed, the microphone 4 sends an entry signal to the main apparatus 2. When a leave switch is pressed, the microphone 4 sends a leave signal to the main apparatus 2. The main apparatus 2 changes the reaction level of the audience in response to the entry signal or the leave signal. This eliminates the necessity that the user has to enter or go out of the room where the main apparatus 2 is set up.

Thus, even before singing a song or after singing the song, the user can virtually experience the realism of a live event.

{3.6. Other Live Performances}

The user can make various performances other than the above-discussed live performances.

For example, the user can sing with the microphone 4 in his/her right hand while wildly rotating his/her left arm holding the controller 5. In this case, the controller 5 sends the motion information 51A indicating the rotating motion of the controller 5 to the main apparatus 2. The performance specifying part 25 specifies the motion of the user's left arm on the basis of the motion information 51A. In this case, the reaction data recording a video image in which the persons in the audience rotate their left arms to the motion of the user is reproduced together with the music data 35.

The user may perform a combination of the above-discussed live performances. For example, the user may lead the audience to sing along and wave at the same time as a live performance. After inputting the sing-along phrase into the microphone 4, the user performs the action of leading the audience to wave as shown in FIG. 10B. The performance specifying part 25 determines that the user leads the audience to sing along on the basis of the detected sing-along phrase and also determines that the user leads the audience to wave on the basis of the detected motion of the user's arms. As a result, the video image in which the persons in the audience wave is displayed on the screen 3a. Further, the musical performance sound of the song being reproduced and the sing-along voice of the audience are outputted from the monitor 3 at the same time.

{4. Functions Other than Live Performances}

{4.1. Audience Designating Function}

When the user enjoys the karaoke by using the karaoke system 100, the user can designate an audience group in the live place. The user needs to make a live performance in accordance with the set audience group.

FIG. 12 is a view showing a setting screen for setting the audience group of the live event. The user sets the audience group on the basis of gender and age by manipulating the not-shown remote control. For setting of gender, the user designates one of a men-dominated group, a women-dominated group, and a mixed group. The men-dominated group is an audience group in which the percentage of men is 80%. The women-dominated group is an audience group in which the percentage of women is 80%. The mixed group is an audience group in which both the percentage of men and the percentage of women are 50%. For setting of age, the user selects one of groups of age 15 to 25, age 25 to 45, and age over 45. By this setting of age, in the audience, the percentage of persons in the age group selected by the user is 70%. As a result, the audience video data 36 in accordance with the audience group set by the user is reproduced together with the music data 35.

In the case where the audience group is set, the reaction level of the audience is changed depending on the song selected by the user and/or the live performance made by the user. For this reason, the user needs to make a live performance in consideration of the audience group. When the user designates a women-dominated group of age over 45, for example, if the user selects a song of relatively slow tempo and makes a live performance not requiring the audience to perform a vigorous action (leads the audience to wave or the like), the reaction level can be increased. On the other hand, if the user selects a hardrock song and repeatedly makes the live performance of exciting the audience for the same audience group, the reaction level of the audience decreases. Thus, by setting the audience group, the user can virtually experience a live event for various audience.

{4.2. Match Play Mode}

The karaoke system 100 can provide a match play mode in which a plurality of users compete in live performance. Hereinafter, discussion will be made on an operation of the main apparatus 2 in the match play mode.

In the match play mode, two users alternately make live performances. Herein, discussion will be made on a case where a match play is performed by using a song having the first, second, and third lyrics. First, the first user sings the first lyrics of the song while making a live performance. Next, the second user sings the second lyrics of the song while making a live performance. At that time, the first and second users use the same microphone 4 and controller 5. A plurality of microphones 4 and controllers 5 may be used, however, in accordance with the number of persons who take part in the match play.

The main apparatus 2 scores the live performance made by each user. One of the first and second users, who wins higher score, can sing the third lyrics of the song lively played.

Herein, how to score a live performance will be discussed. As discussed above, the main apparatus 2 determines a reaction level every time when a user makes a live performance. The main apparatus 2 scores each performance on the basis of the determined reaction level every time when the first user makes a live performance. The sum of the scores for all the live performances made by the first user is calculated as the score that the first user gets. The score of the second user is also calculated in the same manner.

After the second user finishes the live performances, the respective scores of these users are displayed on the screen 3a. The user who is a winner can make a live performance with the third lyrics of the song. Thus, by setting a match play mode, it is possible to provide a new karaoke system in which a plurality of users compete in live performance.

{5. Variations}

The microphone 4 and the controller 5 may each have a vibration function. When the reaction level of the audience exceeds a certain level, for example, the reaction instruction part 26 of the main apparatus 2 sends a vibration instruction signal to the microphone 4 and the controller 5. When the microphone 4 and the controller 5 each receive the vibration instruction signal, the microphone 4 and the controller 5 each vibrate itself for a certain time period (about three seconds). The user can thereby know the reaction of the audience through the microphone 4 and the controller 5 besides the video image of the audience displayed on the screen 3a.

The main apparatus 2 may have a function of selecting a live place. In this case, the user can select one of an arena, a ballpark, a concert hall, and the like, as the live place, by manipulating the not-shown remote control. The main apparatus 2 reproduces the audience video data in accordance with the selected place. The user can thereby virtually experience a live performance as a singer in various live places.

Though the case has been discussed where the main apparatus 2 comprises the voice recognition part 24 as shown in FIG. 2, the microphone 4 may comprise the voice recognition part 24. Every time when the voice recognition part 24 generates the phrase information 24A, the microphone 4 sends the phrase information 24A to the main apparatus 2 in real time.

The case have been discussed where the reaction data 37 records therein a video image and sound representing a reaction of the audience to the live performance. The reaction data 37, however, may record therein only sound representing the reaction of the audience. For example, data recording the cheer of the audience to the live performance of exciting the audience, the handclaps in response to the live performance of leading the audience to clap, the booing of the audience, and the like may be used as the reaction data 37.

The reaction data 37 may be data abstractly indicating a reaction of the audience, instead of the data specifically indicating the action of the audience in response to the live performance. For example, data recording a video image in which a plurality of fireworks (skyrockets) are set off from the live place may be used as the reaction data 37. The reaction instruction part 26 changes the number of fireworks in accordance with the reaction level, and the user can thereby know the reaction of the audience to the live performance. Alternatively, the reaction instruction part 26 may select data recording a video image of the live place with no audience or data recording turbulent sea as the reaction data 37 of low reaction level.

The Second Preferred Embodiment

Hereinafter, the second preferred embodiment of the present invention will be discussed.

{1. Overall Structure of Karaoke System 200}

Figure 13:
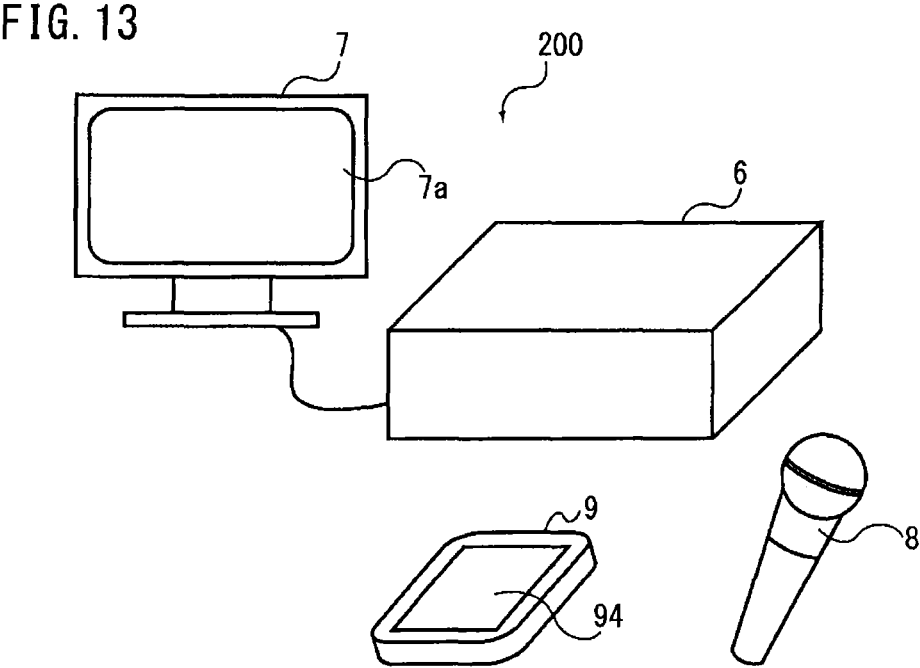
FIG. 13 is a general view showing a karaoke system in accordance with a second preferred embodiment of the present invention.

FIG. 13 is a general view showing a karaoke system 200. As shown in FIG. 13, the karaoke system 200 comprises a main apparatus 6, a monitor 7, a microphone 8, and a remote controller 9.

The main apparatus 6 is a processing apparatus for performing a general control of the karaoke system 200. The main apparatus 6 reproduces music data selected by a user and outputs a video image of a virtual live event.

The monitor 7 is a liquid crystal display or the like and displays thereon the video image of the virtual live event, which is outputted from the main apparatus 6. Specifically, a video image representing a live place crowded with a large audience is displayed on a screen 7a. The monitor 7 comprises a not-shown speaker and outputs the music data reproduced by the main apparatus 6 as sound.

The microphone 8 is a voice input device for inputting the user's voice when the user sing a song. The microphone 8 outputs the voice inputted by the user to the main apparatus 6 as voice data.

The remote controller 9 is a device used when the user selects a song in karaoke. The remote controller 9 serves as a staging instruction device for instructing staging of a virtual live event when the music data is reproduced. In a case where the remote controller 9 is used as the staging instruction device, another user different from the user holding the microphone 8 manipulates the remote controller 9.

Figure 14:
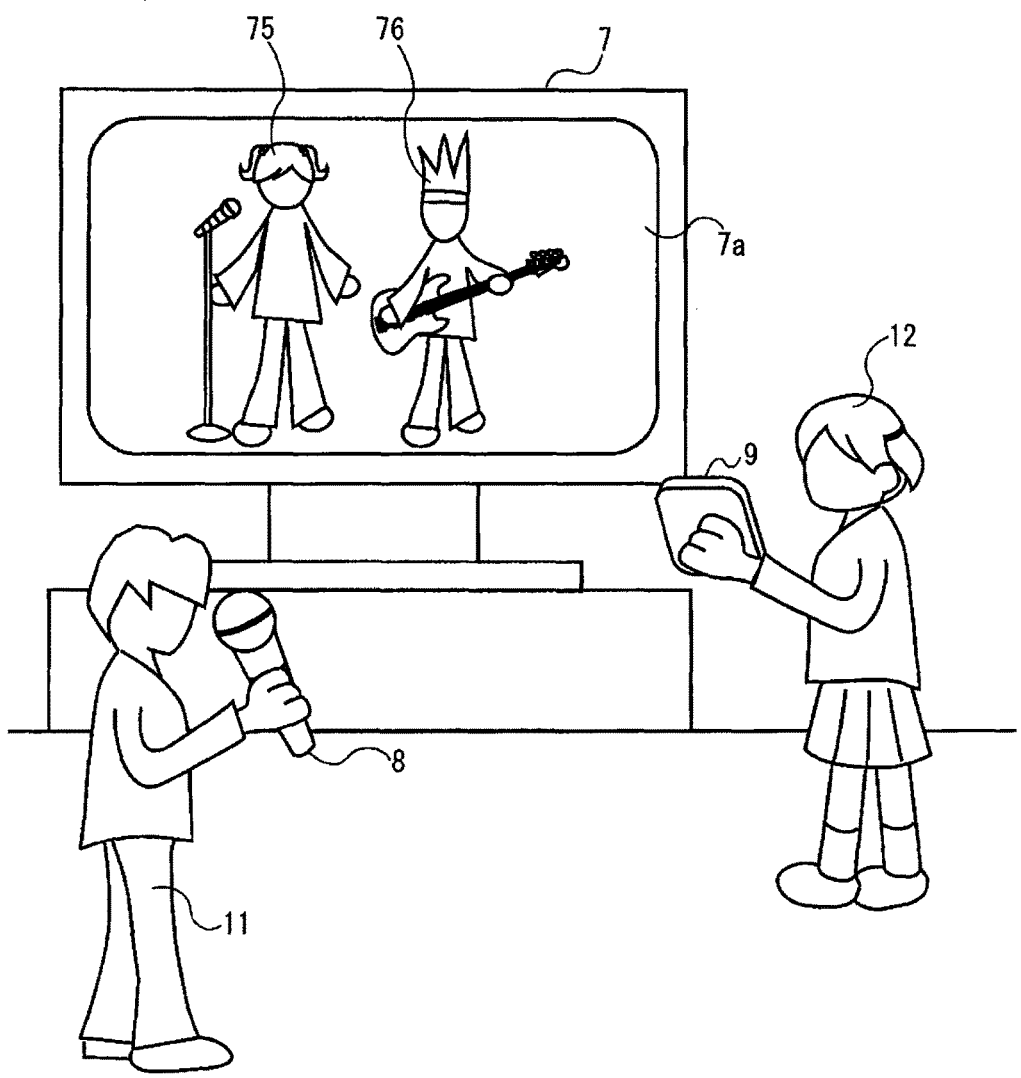
FIG. 14 is a view showing how to use a microphone and a remote controller shown in FIG. 13.

FIG. 14 is a view showing how to use the microphone 8 and the remote controller 9 in the karaoke system 200. In FIG. 14, the main apparatus 6 is not shown. A user 11 holds the microphone 8 and sings a song to the music reproduced by the main apparatus 6. On the screen 7a, displayed are a vocal 75 and a guitarist 76 as characters performing a live event in a virtual live place. The user 11 who holds the microphone 8 acts as the vocal 75 in the virtual live event.

A user 12 manipulates the remote controller 9 to direct the virtual live event. In other words, the user 12 acts as a staging director of the live event and changes the video image and the sound in the virtual live event to be displayed on the screen 7a. The user 12 can liven up the virtual live event together with the user 11 even when the user 12 does not sing a song. Thus, since the users 11 and 12 play various roles in the live event, such as a singer who sing songs, a staging director, and the like, to liven up the virtual live event, both the users 11 and 12 can enjoy the karaoke together.

Figure 15:
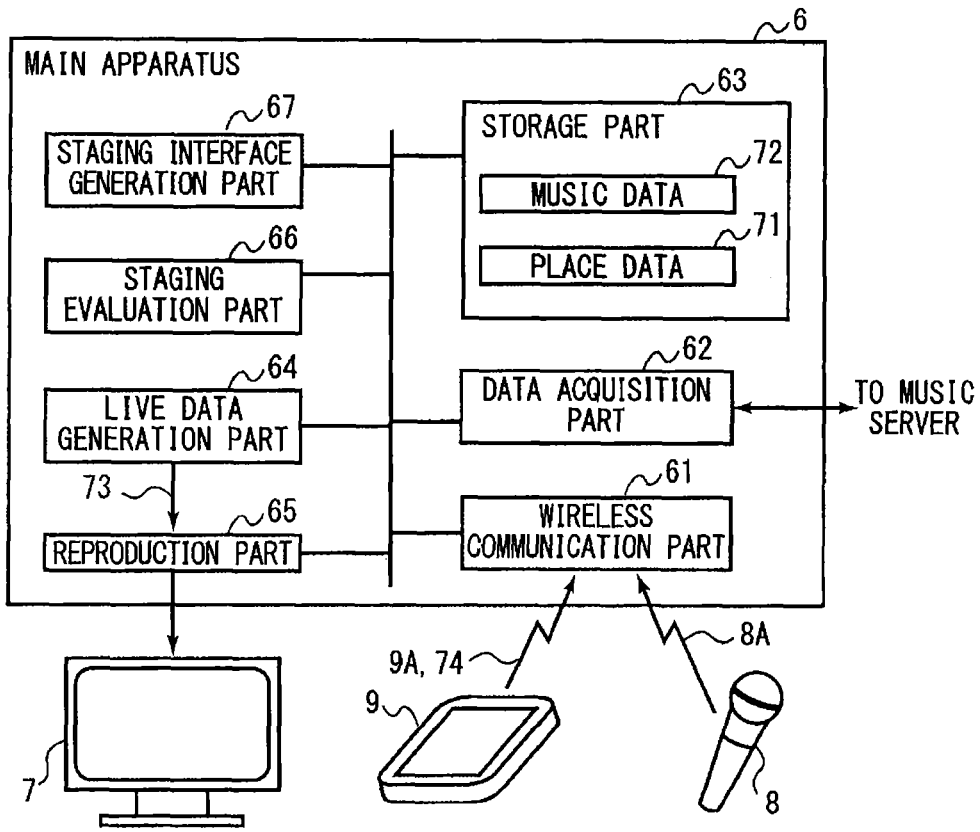
FIG. 15 is a functional block diagram showing a main apparatus shown in FIG. 13.

FIG. 15 is a block diagram showing a functional constitution of the main apparatus 6. As shown in FIG. 15, the main apparatus 6 comprises a wireless communication part 61, a data acquisition part 62, a storage part 63, a live data generation part 64, a reproduction part 65, a staging evaluation part 66, and a staging interface generation part 67.

The wireless communication part 61 performs wireless communication with the microphone 8 and the remote controller 9. The wireless communication part 61 receives voice data 8A generated by the microphone 8. The wireless communication part 61 receives voice data 9A and staging instruction information 74 which are generated by the remote controller 9. The wireless communication can be performed by using Bluetooth (registered trademark), a wireless LAN, infrared communication, or the like.

The data acquisition part 62 acquires music data 71 corresponding to a song selected by the user from a not-shown music server. The music data 71 is data recording the musical performance sound of the song selected by the user.

The storage part 63 is a hard disk unit or the like, and stores therein the music data 71 and place data 72. The place data 72 is used to generate live data 73 recording a video image and sound of the virtual live event. The place data 72 includes object data of the vocal 75, the guitarist 76, visitors in the live place, and the like. The place data 72 includes data indicating a positional relation of a stage, audience seats, and the like, as data indicating a structure of the live place.

The live data generation part 64 generates the live data 73 recording a video image and sound of the live event held in the virtual live place by using the voice data 8A inputted from the microphone 8, the music data 71, and the place data 72. The video image of the live event includes not only a video image of the stage in the live place but also video images representing the visitors and the appearance in the entire live place. The sound of the live event includes not only the reproduced sound of the music data 71 and the voice of the user 11 but also a cheer of the visitors, staging sound based on the manipulation by the user 12, and the like.

The live data generation part 64 changes a generation condition of the live data 73 on the basis of the staging instruction information 74 transmitted from the remote controller 9. The staging instruction information 74 is information indicating a staging content in the virtual live event and transmitted from the remote controller 9.

The reproduction part 65 reproduces the live data 73 and outputs the video image and the sound in the live event to the monitor 7.

The staging evaluation part 66 evaluates the staging of the live event on the basis of the staging instruction information 74. The staging evaluation part 66 instructs generation of the live data 73 representing how the visitors react to the staging of the live event on the basis of an evaluation result. Then, on the basis of the evaluation result, generated is the live data 73 in which the visitors give a loud cheer or boo the performance.

The staging interface generation part 67 generates a staging interface in accordance with a staging selected by the user 12. The staging interface is displayed on a touch panel display 94 of the remote controller 9 (see FIG. 16).

Figure 16:
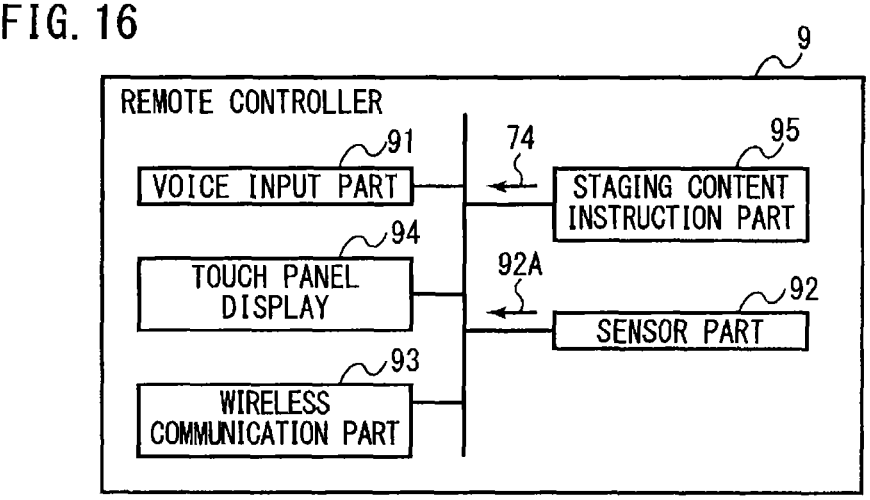
FIG. 16 is a functional block diagram showing a remote controller shown in FIG. 13.

FIG. 16 is a block diagram showing a functional constitution of the remote controller 9. As shown in FIG. 16, the remote controller 9 comprises a voice input part 91, a sensor part 92, a wireless communication part 93, a touch panel display 94, and a staging content instruction part 95.

The voice input part 91 converts the voice given by the user into an electrical signal and outputs the voice data 9A. The sensor part 92 comprises an acceleration sensor for detecting a change of a motion of the remote controller 9 and outputs motion information 92A indicating a motion of the remote controller 9. The sensor part 92 may comprise a terrestrial magnetism sensor, a gyroscope, and/or the like besides the acceleration sensor.

The wireless communication part 93 performs wireless communication with the main apparatus 6 to transmit the voice data 9A and the staging instruction information 74 to the main apparatus 6. The staging interface is displayed on the touch panel display 94. The user 12 uses the staging interface displayed on the touch panel display 94 to instruct a staging of the virtual live event.

The staging content instruction part 95 displays the staging interface transmitted from the main apparatus 6, on the touch panel display 94. The staging content instruction part 95 generates the staging instruction information 74 on the basis of the manipulation of the staging interface by the user 12 and sends the staging instruction information 74 to the main apparatus 6. The staging interface will be discussed later in detail.

{2. Overview of Staging}

Figure 17:
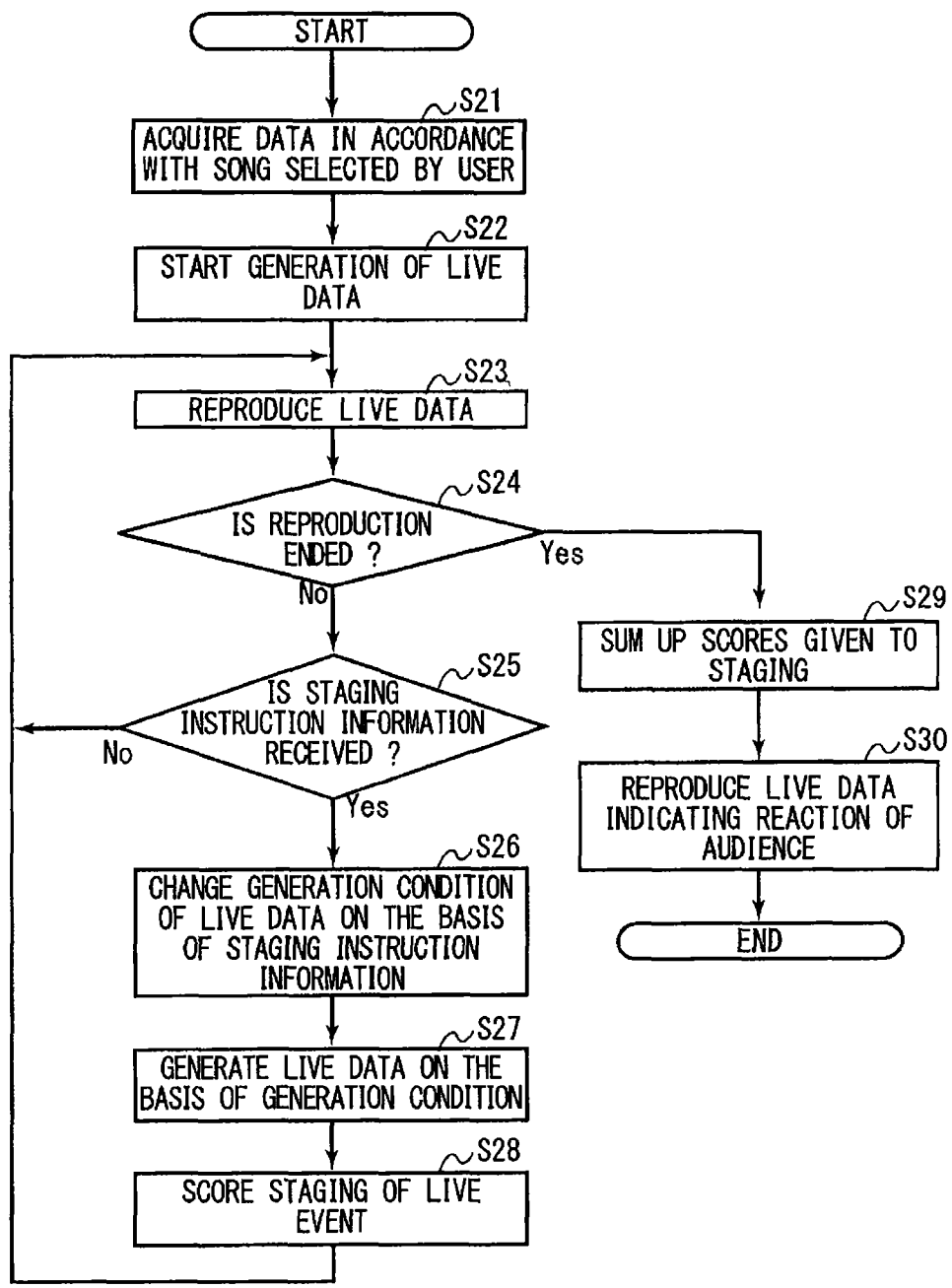
FIG. 17 is a flowchart showing an operation flow of the main apparatus shown in FIG. 13.

Hereinafter, discussion will be made on an operation for performing staging of the virtual live event in accordance with the manipulation of the remote controller 9 by the user 12, centering on an operation of the main apparatus 6. FIG. 17 is a flowchart showing the operation of the main apparatus 6.

First, the user 11 selects music data 71 that the user 11 wants to sing in the karaoke by manipulating the remote controller 9. The data acquisition part 62 acquires the selected music data 71 from the music server (not shown) (Step S21). The data acquisition part 62 stores the acquired music data 71 into the storage part 63. The place data 72 is stored in the storage part 63 in advance.

The live data generation part 64 starts to generate the live data 73 by using the music data 71 and the place data 72 (Step S22). Specifically, the live data generation part 64 generates video data recording a video image of the virtual live place by using the place data 71. The live data generation part 64 outputs data including the generated video data and the music data 71, as the live data 63, to the reproduction part 65.

When the main apparatus 6 receives the voice data 8A from the microphone 8, the live data generation part 64 generates the live data 63 including the voice data 8A. The song sung by the user 11 is thereby outputted from the monitor 7. The live data generation part 64 may include voice data recording the cheer of the visitors and the like in the live data 73, to the timing of reproducing the intro and the impressive melody line of the music data 71.

The reproduction part 65 starts to reproduce the live data 73 generated by the live data generation part 64 (Step S23). By reproducing the live data 73, a video image of the virtual live event is displayed on the screen 7a and the reproduced sound of the music data 71 is outputted from the speaker of the monitor 7.

The main apparatus 6 repeatedly executes the operations of Steps S25 to S28 until the reproduction of the music data 71 is ended ("Yes" in Step S24). As shown in FIG. 14, during the reproduction of the music data 71, the user 11 sings a song while holding the microphone 8. The user 12 manipulates the remote controller 9 to direct the virtual live event. The remote controller 9 generates the staging instruction information 74 in accordance with the manipulation made by the user 12 and sends the staging instruction information 74 to the main apparatus 6 in real time.

When the main apparatus 6 receives the staging instruction information 74 ("Yes" in Step S25), the live data generation part 64 changes the generation condition of the live data 73 on the basis of the staging instruction information 74 (Step S26). The live data generation part 64 generates the live data 73 on the basis of the generation condition changed on the basis of the staging instruction information 74 (Step S27). When the staging instruction information 74 is information indicating the setting off of fireworks, the live data 73 generate a video image representing a scene in which fireworks are set off in the live place. The detailed content that the user 12 can direct in the virtual live event will be discussed later.

The staging evaluation part 66 evaluates the staging on the basis of the timing of inputting the staging instruction information 74, the staging content indicated by the staging instruction information 74, and the like (Step S28). When the fireworks are set off while the impressive melody line of the music data 71 is reproduced, for example, the staging evaluation part 66 judges that this staging can liven up the visitors and gives a high score to the staging by the user 12.

When the reproduction of the live data 73 is ended (when the reproduction of the music data 71 is ended) ("Yes" in Step S24), the staging evaluation part 66 sums up the scores given to the staging directions by the user 12 (Step S29). The staging evaluation part 66 instructs generation of the live data 73 indicating the reaction of the visitors on the basis of the total value of the scores. The live data 73 generated by the live data generation part 64 is reproduced by the reproduction part 65 (Step S30).

Figure 18:
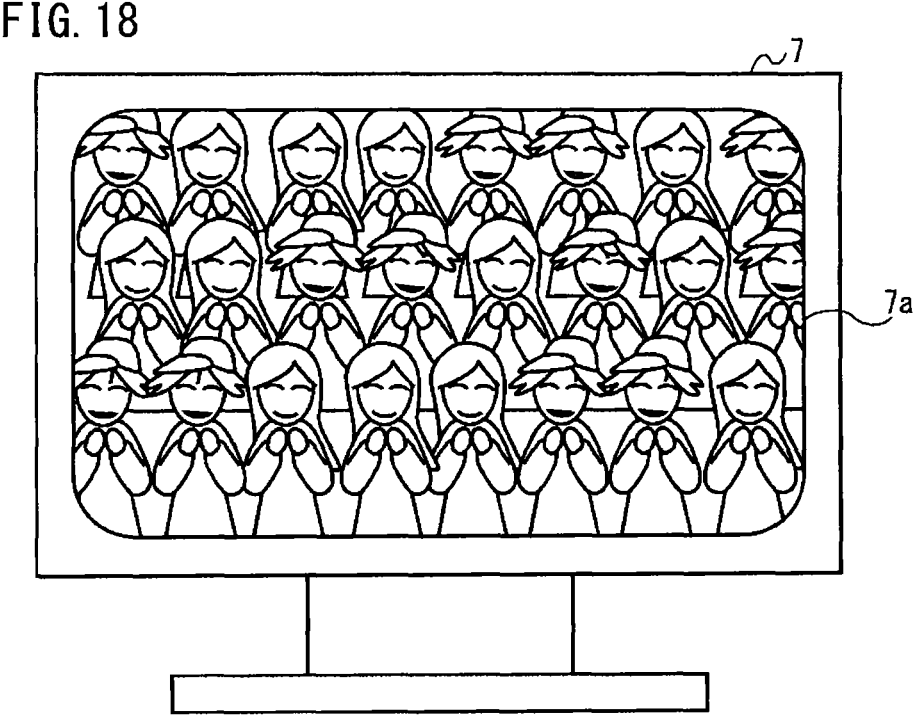
FIG. 18 is a view showing a video image in a case where live data representing a reaction of visitors is reproduced by the main apparatus shown in FIG. 13.

FIG. 18 is a view showing a video image on the screen 7a in a case where the live data 73 representing the reaction of the visitors is reproduced. When the total value is higher than a predetermined threshold value, the video image representing a scene in which all the visitors clap is displayed on the screen 7a as shown in FIG. 18 and the cheer of the visitors is outputted from the speaker of the monitor 7. When the total value is lower the threshold value, the video image and the sound representing booing of the visitors is outputted from the monitor 7.

The user 12 can thereby know the evaluation of the staging of the virtual live event. Since the evaluation of the staging direction by the user 12 is indicated as the reaction of the visitors in the live place, the user 12 can manipulate the remote controller 9 while feeling the sense of tension in directing an actual live event.

The staging evaluation part 66 may instruct the live data generation part 64 to generate the live data 73 in accordance with the evaluation result every time when the staging evaluation part 66 makes the evaluation of the staging direction by the user 12. In this case, the live data generation part 64 generates the live data 73 (data indicating the reaction of the visitors) corresponding to the score given by the staging evaluation part 66 after generating the live data 73 corresponding to the staging instruction information 74. Every time when the user 12 instructs the staging of the live event, the reaction of the visitors to the staging of the live event is outputted from the monitor 7. Therefore, the user 12 can know the evaluation of the staging for the virtual live event every time when the user 12 manipulates the remote controller 9.

{3. Specific Examples of Staging}

Hereinafter, as specific examples of the staging which can be realized in the virtual live event when the user 12 manipulates the remote controller 9, introduction of song, mixer operation, setting off of fireworks, and lighting instruction will be discussed.

{3.1. Introduction of Song}

The introduction of song is a staging method in which the user 12 acts as MC of the live event and introduces the song to be sung by the user 11.

Detailed discussion will be made below on a procedure for introduction of song. The user 12 manipulates the remote controller 9 to display a selection screen (not shown) of the staging on the touch panel display 94. When the user 12 selects "Introduction of Song", the staging interface for introduction of song is displayed on the touch panel display 94.

Figure 19:
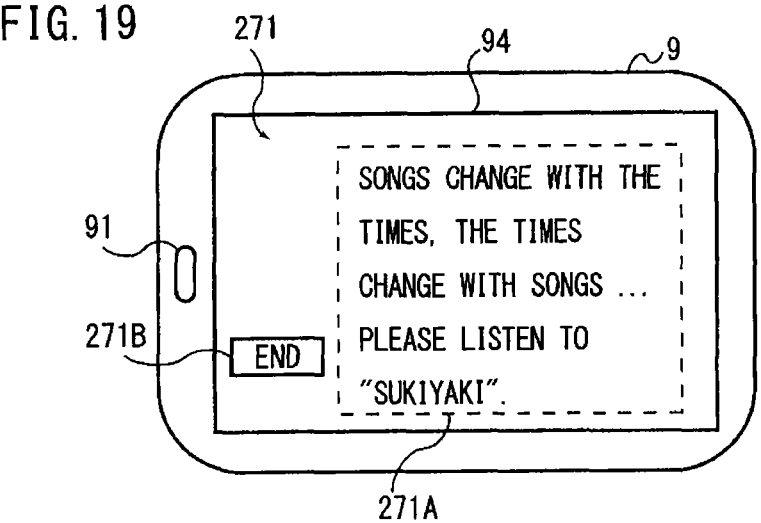
FIG. 19 is a view showing a staging interface for introduction of song displayed on the remote controller shown in FIG. 13.

FIG. 19 is a view showing the remote controller 9 displaying a staging interface 271 for introduction of song.

When the user 12 selects the introduction of song, the staging content instruction part 95 requests the main apparatus 6 to display the staging interface 271. In response to the request of the staging content instruction part 95, the staging interface generation part 67 generates the staging interface 271 and sends the staging interface 271 to the remote controller 9. The staging interface 271 is thereby displayed on the touch panel display 94 as shown in FIG. 19.

In the staging interface 271, displayed is script data 271A to be used by the user 12 to introduce a song. In the staging interface generation part 67, various patterns of script data 271A, 271A, . . . are set. The staging interface generation part 67 selects script data 271A on the basis of the length of the intro of the music data 71 selected by the user 11, the genre of the music data 71, and the like. On the basis of the selected script data 271A, screen data of the staging interface 271 is generated.

When the reproduction of the music data 71 selected by the user 11 is started, the live data generation part 64 generates the live data 73 recording a video image of the characters such as the vocal 75, the guitarist 76, and/or the like standing on a stage as shown in FIG. 14. At that time, the live data generation part 64 may generate the live data 73 recording a video image of the MC who is the user 12 as well as the vocal 75 and the like.

The user 12 reads aloud the script data 271A displayed in the staging interface 271 before the reproduction of the intro of the music data 71 is ended, to thereby introduce the song to be sung by the user 11.

Specifically, the voice input part 91 inputs the voice of the user 12 and generates the voice data 9A. The staging content instruction part 95 sends the voice data 9A as the staging instruction information 74 to the main apparatus 6 in real time. The live data generation part 64 generates the live data 73 including the voice data 9A and outputs the live data 73 to the reproduction part 65. The voice of introducing the song is thereby outputted form the speaker of the monitor 7. When the user 12 finishes reading aloud the script data 271A displayed in the staging interface 271 (the introduction of song is ended), the user 12 touches an end button 271B. In response to the touch of the button, the staging content instruction part 95 sends the staging instruction information 74 (introduction end notification) indicating that the introduction of song is ended to the main apparatus 6.

The staging evaluation part 66 evaluates the introduction of song performed by the user 12 on the basis of the introduction end notification. Specifically, when the introduction of song is ended at the timing of the end of the intro (immediately before the user 11 starts singing), a high score is given to the introduction of song performed by the user 12. At that time, the staging evaluation part 66 may give a higher score to the introduction of song as the difference between the timing when the introduction of song is ended and the timing when the intro is ended is smaller. When the introduction of song is not ended by the end of the intro, the staging evaluation part 66 does not give any score to the introduction of song.

The live data generation part 64 generates the live data 73 indicating the reaction of the visitors in the live place on the basis of the given score. When the score is high, for example, the live data generation part 64 generates the live data 73 recording a video image in which all the visitors clap as shown in FIG. 18.

The staging evaluation part 66 may evaluate the introduction of song by judging whether or not the user 12 reads aloud the script without any error. For example, the staging evaluation part 66 performs a voice recognition process on the voice data 9A to specify a phrase that the user 12 inputs to the voice input part 91. The staging evaluation part 66 can judge whether or not there is an error in reading the script by comparing the specified phrase with the script data 271A displayed in the staging interface 271.

The staging evaluation part 66 may evaluate the introduction of song performed by the user 12 on the basis of the rhythm with which the user 12 reads aloud the script. In this case, the staging evaluation part 66 detects the rhythm with which the user 12 reads aloud the script on the basis of the voice data 9A. When the lag between the rhythm of the intro and the rhythm in reading aloud the script is small, the staging evaluation part 66 may give a high score to the introduction of song.

Thus, since the user 12 acts as the MC to direct the live event, the user 12 can virtually experience the sense of tension in the live event even if the user 12 does not sing any song.

{3.2. Mixer Operation}

The mixer operation is a staging method of adjusting an output condition of the music played in the live event by changing a reproduction condition of the music data 71 and/or switching ON/OFF of the microphone 8. The user 12 directs the live event by manipulating a virtual mixer displayed on the touch panel display 94.

Figure 20:
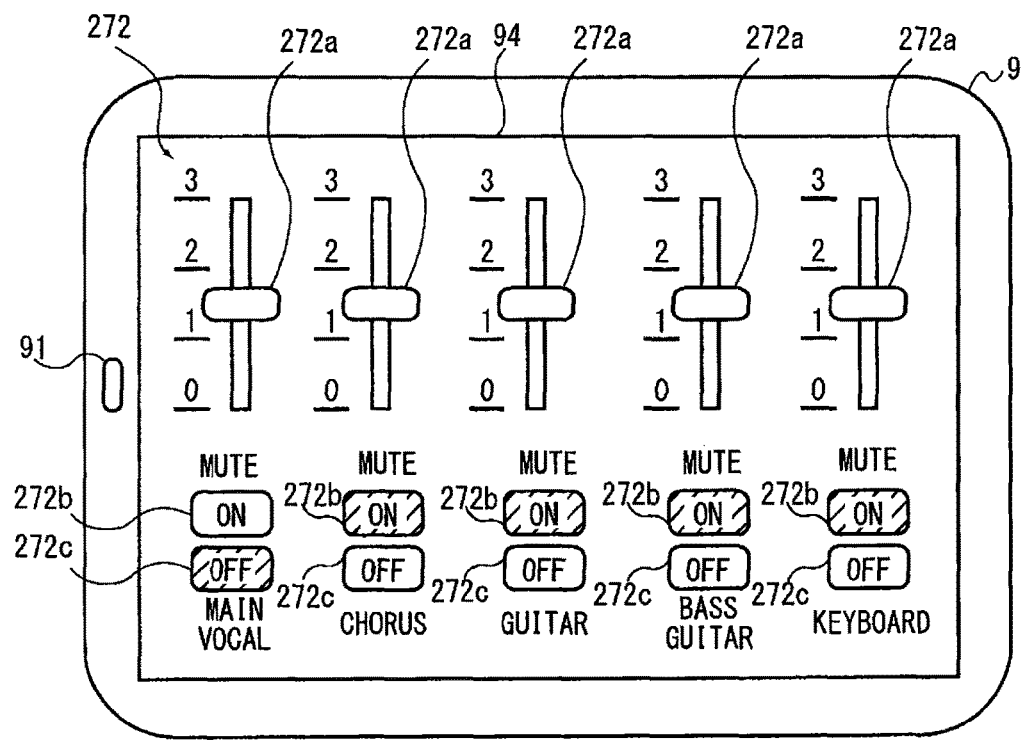
FIG. 20 is a view showing a staging interface for mixer operation displayed on the remote controller shown in FIG. 13.

FIG. 20 is a view showing the remote controller 9 displaying a staging interface 272 for mixer operation. The user 12 manipulates the remote controller 9 to select "Mixer Operation". In response to the selection by the user 12, the staging content instruction part 95 requests the main apparatus 6 to display the staging interface 272 for mixer operation. The staging interface generation part 67 generates the staging interface 272 used for mixer operation and sends the staging interface 272 to the remote controller 9. The staging interface 272 shown in FIG. 20 is thereby displayed on the remote controller 9.

Figure 21:
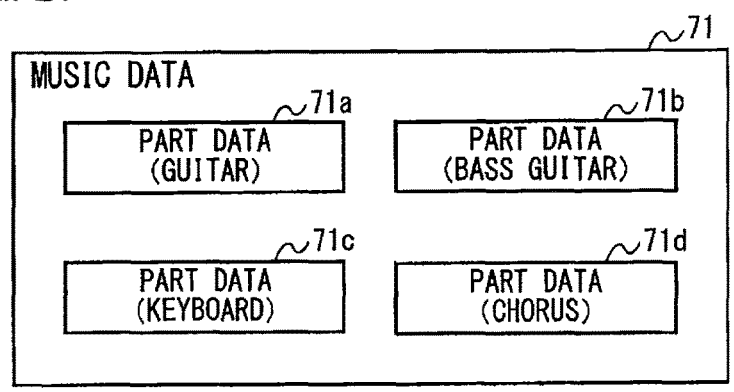
FIG. 21 is a view showing a format of music data shown in FIG. 15.

FIG. 21 is a view showing a format of the music data 71. As shown in FIG. 21, the music data 71 is composed of pieces of part data 71a to 71d corresponding to the parts of guitar, bass guitar, keyboard, and chorus. The user 12 manipulates the staging interface 272 to adjust the volumes of the pieces of part data 71a to 71d.

As shown in FIG. 20, in the staging interface 272, displayed are volume controllers 272a, 272a, . . . , mute buttons 272b, 272b, . . . , and mute cancel buttons 272c, 272c, . . . corresponding to the microphone 8 and the parts of the music data 71, respectively. The volume controllers 272a are interfaces for adjusting the volumes of the microphone 8 and the parts. The mute buttons 272b are interfaces for muting the sound of the microphone 8 and the parts. The mute cancel buttons 272c are interfaces for cancelling the mute states of the microphone 8 and the parts. In FIG. 20, when there is an instruction to mute the sound in the microphone 8 or each of the parts, the mute button 272b of the indicated one is hatched. When there is an instruction to cancel the mute state, the mute cancel button 272c of the indicated one is hatched.

The staging content instruction part 95 generates the staging instruction information 74 in accordance with the manipulation on the staging interface 272 by the user 12 and sends the staging instruction information 74 to the main apparatus 6 in real time. The staging instruction information 74 for the mixer operation includes information indicating a part whose volume is to be adjusted and another information indicating the volume of the indicated part. The live data generation part 64 generates the live data 73 in which the volumes of some of the microphone 8 and the pieces of part data 71a to 71d are adjusted on the basis of the staging instruction information 74 for the mixer operation.

The user 12 can adjust, for example, the volume of the microphone 8 by using the staging interface 272. When the reproduction of the music data 71 is started, the user 12 touches the mute button 272b corresponding to the microphone 8. The staging instruction information 74 for instructing muting of the sound of the microphone 8 is transmitted to the main apparatus 6. When the live data generation part 64 receives an instruction to mute the sound of the microphone 8, the live data generation part 64 does not include the voice data 8A (see FIG. 15) transmitted from the microphone 8 in the live data 73. Even if the user 11 inputs his/her voice into the microphone 8, the voice of the user 11 is not outputted from the monitor 7.

The user 12 touches the mute cancel button 272c corresponding to the microphone 8 at the timing when the intro of the music data 71 is ended. Then, the staging instruction information 74 for instructing the cancel of the mute state of the microphone 8 is sent to the main apparatus 6. The live data generation part 64 generates the live data 73 including the voice data 8A. The singing voice of the user 11 is thereby outputted from the monitor 7.

The user 12 may perform the mixer operation when the solo performance of the guitar is made. For example, the live data generation part 64 generates a video image with an added message indicating the start timing and the end timing of the solo performance of the guitar, to thereby notify the user 12 of the start timing and the end timing of the solo performance of the guitar.

The user 12 touches the mute buttons 272b corresponding to the microphone 8 and the parts other than the guitar at the timing of starting the solo performance. The user 12 may increase the volume of the part data 71a by sliding the volume controller 272a so as to increase the volume of the guitar. The user 12 touches the mute cancel buttons 272c corresponding to the microphone 8 and the parts other than the guitar at the timing of ending the solo performance of the guitar. The ordinary performance can be thereby restarted.

The staging evaluation part 66 evaluates the staging direction of mixer operation on the basis of the volume adjustment instructed by the staging instruction information 74, the timing of instructing the volume adjustment, and the like. When the user 12 cancels the mute state of the microphone 8 at the timing of ending the intro as discussed above, for example, high score is given to the mixer operation. At that time, the staging evaluation part 66 may give higher score as the time difference between the timing of ending the intro and the timing of cancelling the mute state of the microphone 8 is smaller. In a case where the mute state of the microphone 8 is not cancelled even when the intro is ended, low score is given to the mixer operation since the singing voice of the user 11 is not outputted to the virtual live place.

Further, the user 12 can prevent the howl from arising in the live place by adjusting the respective volumes of the parts to appropriate levels. When all the volume levels of the volume controllers 272a, 272a, . . . reaches a predetermined level (for example, 2 or more), the live data generation part 64 generates the live data 73 including the howling sound. In this case, the staging evaluation part 66 judges that the user 12 performs a wrong mixer operation and reduces the score given to the mixer operation.

FIG. 20 shows the staging interface 272 having only a volume control function for the parts and the microphone 8. Like a generally-used audio mixer, however, the staging interface 272 may have an equalizer function of changing the characteristic of frequency in the reproduction of the pieces of part data.

Thus, the volume control of the microphone 8 and the parts of the music can be performed in real time. Therefore, since the user 12 acts as a sound director of the virtual live event to manipulate the remote controller 9, the user 12 can enjoy the karaoke together with the user 11.

{3.3. Setting Off of Fireworks}

The setting off of fireworks is a staging method of setting off fireworks in the virtual live place during the reproduction of the music data 71. The user 12 can designate the type of firework to be set off in the live place and the timing of setting off the firework by manipulating the staging interface for setting off of fireworks.

Figure 22:
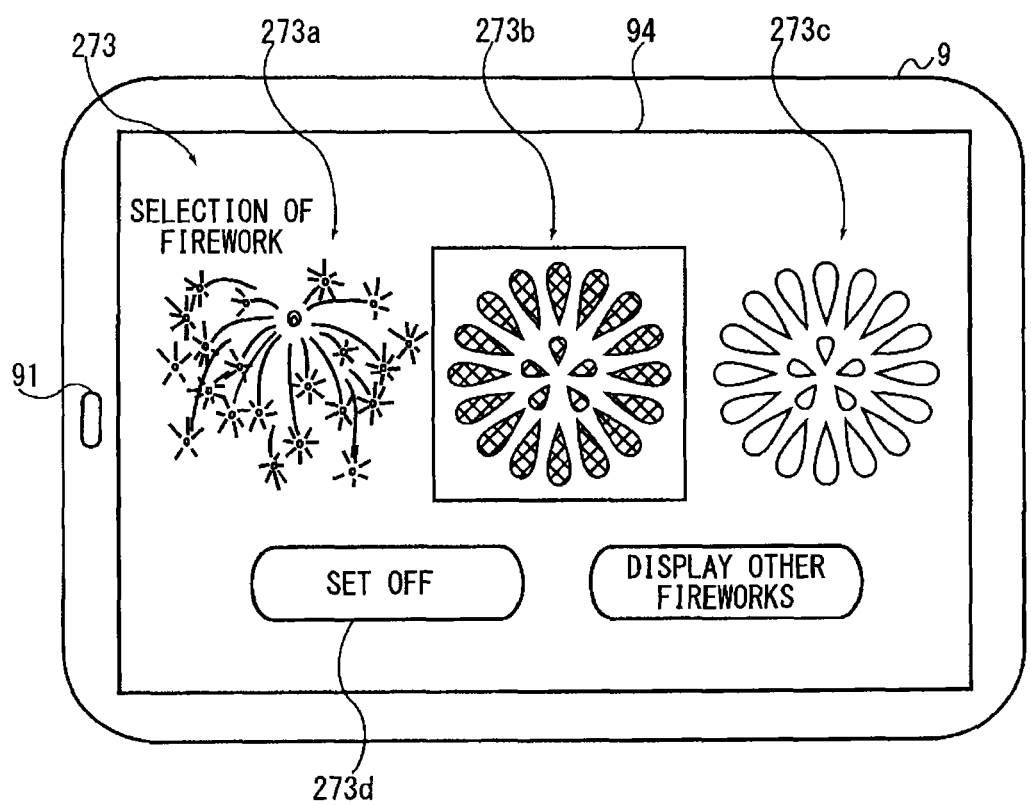
FIG. 22 is a view showing a staging interface for setting off fireworks displayed on the remote controller shown in FIG. 13.

FIG. 22 is a view showing the remote controller 9 displaying a staging interface 273 for setting off of fireworks. In response to the selection by the user 12, the staging content instruction part 95 requests the main apparatus 6 to display the staging interface 273 for setting off of fireworks. The staging interface generation part 67 generates the staging interface 273 and sends the staging interface 273 to the remote controller 9. The staging interface 273 shown in FIG. 22 is thereby displayed on the remote controller 9.

The user 12 can select a firework to be set off and instruct setting off of the selected fireworks by manipulating the staging interface 273 during the reproduction of the music data 71. Specifically, the user 12 touches one of fireworks 273a to 273c displayed in the staging interface 273 to select the firework to be set off. In the staging interface 273 shown in FIG. 22, the firework 273b is selected. The user 12 touches a set-off button 273d to instruct the setting off of the selected firework 273b.

Figure 23:
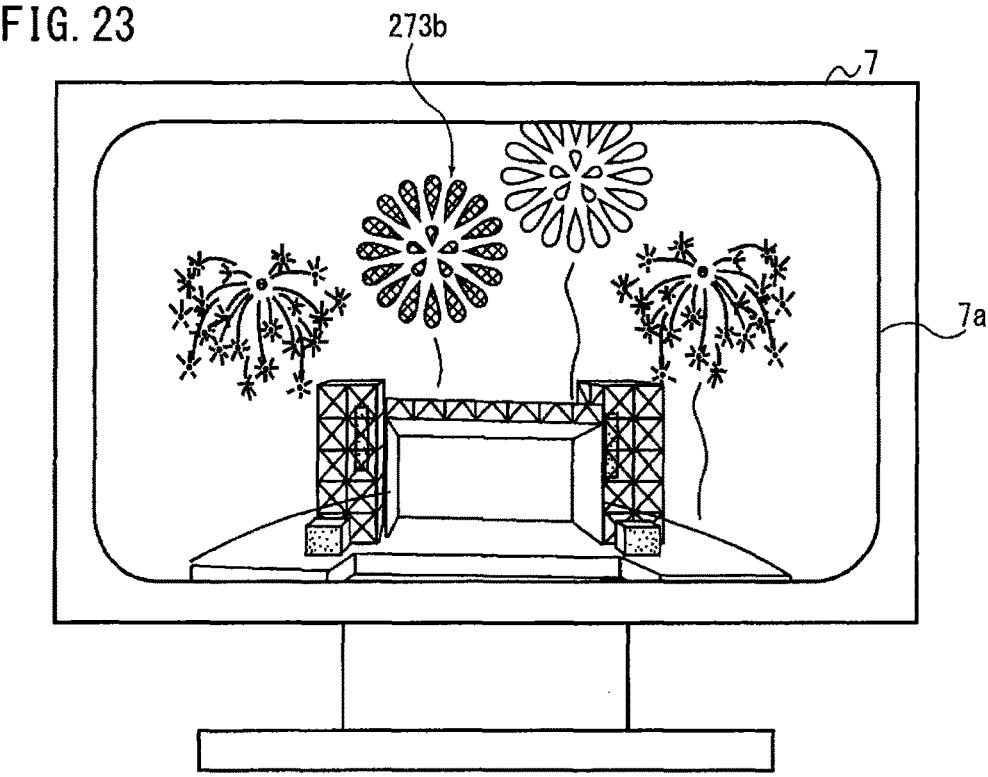
FIG. 23 is a view showing a video image displayed on the monitor shown in FIG. 13.

FIG. 23 is a view showing a scene in which the fireworks are set off in the live place. When the set-off button 273d is touched, the staging content instruction part 95 sends the staging instruction information 74 used for instructing setting off of the selected firework 273b to the main apparatus 6. The live data generation part 64 generates the live data 73 including a video image in which the fireworks 273b are set off in the background of the stage and popping sound of the fireworks on the basis of the staging instruction information 74. As shown FIG. 23, the video image in which the fireworks are set off in the background of the stage in the live place is displayed on the screen 7a of the monitor 7.

The user 12 can continuously set off the fireworks in the background of the stage by repeating the above manipulation. The user 12 may select both the fireworks 273a and 273b and then touch the set-off button 273d. In this case, the live data generation part 64 generates the live data 73 including a video image in which the fireworks 273a and 273b are set off at the same time.

The staging evaluation part 66 evaluates the setting off of fireworks on the basis of the staging instruction information 74 instructing the setting off of the fireworks. In other words, the staging of setting off of the fireworks is scored on the basis of the timing of setting off the fireworks, the number of fireworks set off, and the like. When there is an instruction to set off the fireworks at the timing of starting to play the impressive melody line of the song and the timing of ending the reproduction of the music data 71, the staging evaluation part 66 gives a high score to the staging direction of setting off of the fireworks.

{3.4. Lighting (1)}

The user 12 can act as a lighting director of the live place to perform a staging direction of a virtual live event. Specifically, the user 12 can shine a spotlight on various areas in the live place by manipulating the remote controller 9.

Figure 24:
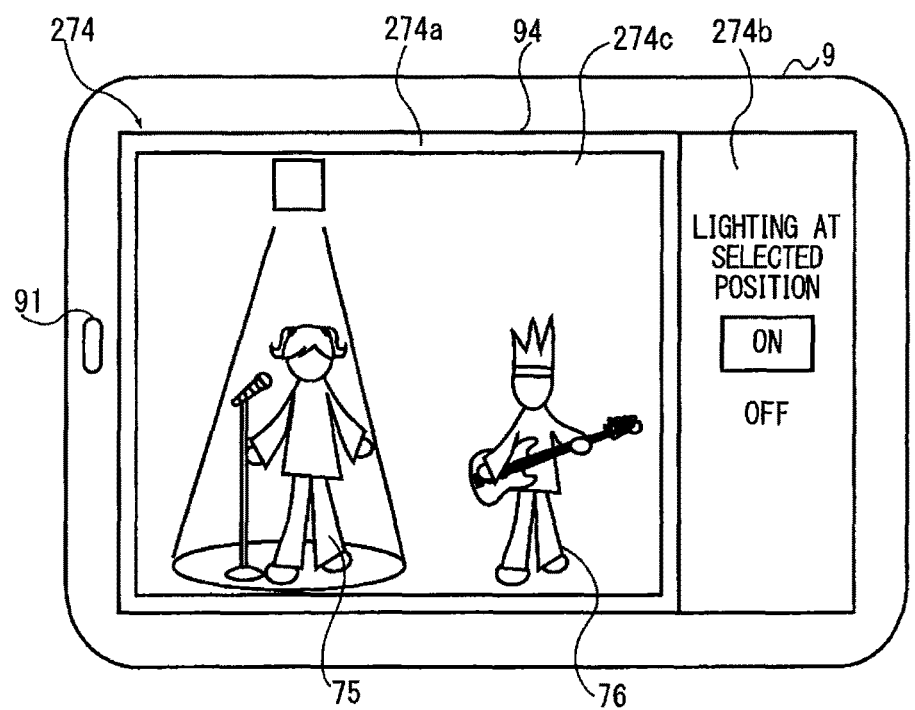
FIG. 24 is a view showing a staging interface for lighting instruction displayed on the remote controller shown in FIG. 13.

FIG. 24 is a view showing the remote controller 9 displaying a staging interface 274 for lighting instruction. The user 12 manipulates the remote controller 9 to select "Lighting Instruction". In response to the selection by the user 12, the staging content instruction part 95 requests the main apparatus 6 to display the staging interface 274 for lighting instruction. The staging interface generation part 67 generates the staging interface 274 and sends the staging interface 274 to the remote controller 9. The staging interface 274 is thereby displayed on the remote controller 9 as shown in FIG. 24.

The staging interface 274 comprises a video image display field 274a and a lighting instruction field 274b. In the video image display field 274a, displayed is video data 274c representing the stage in the live place. In the lighting instruction field 274b, displayed are buttons used for designating ON/OFF of the lighting. The monitor 7 displays the same video image as the video data 274c. The user 12 can shine a spotlight on the vocal 75 or the guitarist 76 standing on the stage by manipulating the staging interface 274.

Figure 25:
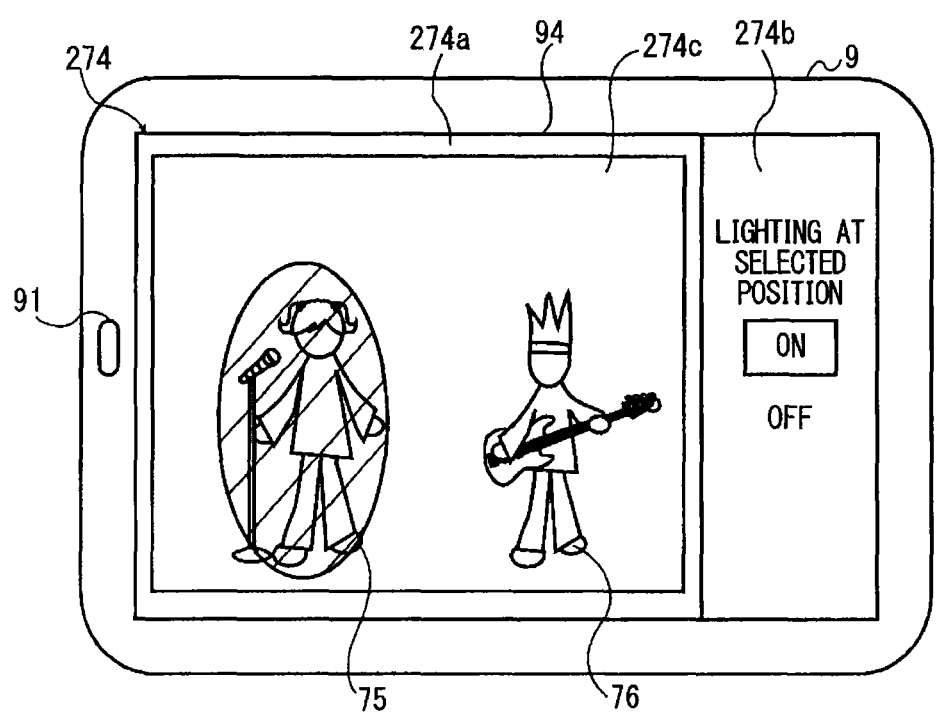
FIG. 25 is a view showing a staging interface for lighting instruction displayed on the remote controller shown in FIG. 13.

FIG. 25 is a view showing the staging interface 274 where an object for lighting is selected. In order to shine a spotlight on the vocal 75, the user 12 touches the vocal 75 displayed in the video image display field 274a. The staging content instruction part 95 makes a hatch on the vocal 75 displayed in the video image display field 274a as an object for lighting.

Next, the user 12 touches the button of "OK" in the lighting instruction field 274b, to thereby instruct lighting of the vocal 75. The staging content instruction part 95 generates the staging instruction information 74 used for instructing lighting of the vocal 75 and sends the staging instruction information 74 to the main apparatus 6. The live data generation part 64 generates the live data 73 including a video image in which a spotlight is shined on the vocal 75 on the basis of the staging instruction information 74.

The main apparatus 6 sends the generated live data 73 to the remote controller 9 as the video data 274c. As shown in FIG. 24, the video data 274c representing an image in which the spotlight is shined on the vocal 75 is displayed in the video image display field 274a. The reproduction part 65 reproduces the live data 73, and the same video image as the video data 274c shown in FIG. 24 is displayed on the monitor 7.

The user 12 can change an object for lighting. When the solo performance of the guitar is made during the reproduction of the music data 71, for example, the object for lighting can be changed to the guitarist 76. The user 12 selects the vocal 75 displayed in the video image display field 274a and touches the button of "OFF" in the lighting instruction field 274b. Next, the user 12 selects the guitarist 76 displayed in the video image display field 274a and touches the button of "ON" in the lighting instruction field 274b. The object for lighting is thereby changed from the vocal 75 to the guitarist 76.

Further, the user 12 may select both the vocal 75 and the guitarist 76 and touch the button of "ON" in the lighting instruction field 274b. In this case, the video data 274c representing an image in which the spotlight is shined on both the vocal 75 and the guitarist 76 is displayed in the video image display field 274a.

The staging evaluation part 66 evaluates the staging of lighting on the basis of the content of the staging instruction information 74 and the timing of receiving the staging instruction information 74. When the spotlight is shined only on the vocal 75 at the timing when the impressive melody line of the song is reproduced, for example, a high score is given to the staging of lighting. Similarly, when the spotlight is shined only on the guitarist 76 at the timing when the solo performance of the guitar is made, a high score is given to the staging of lighting. When the spotlight is shined on the guitarist 76, instead of the vocal 75, at the timing when the impressive melody line of the song is reproduced, the staging evaluation part 66 does not give any score to the staging of lighting. Alternatively, the staging evaluation part 66 may reduce the given score.

{3.5. Lighting (2)}

The user 12 may designate the direction of radiation of lighting by moving the remote controller 9. The user 12 can shine the spotlight not only on the stage but also on the visitors in the live place. In this case, the direction of radiation is determined on the basis of the motion information 92A (see FIG. 16) outputted from the sensor part 92.

Figure 26:
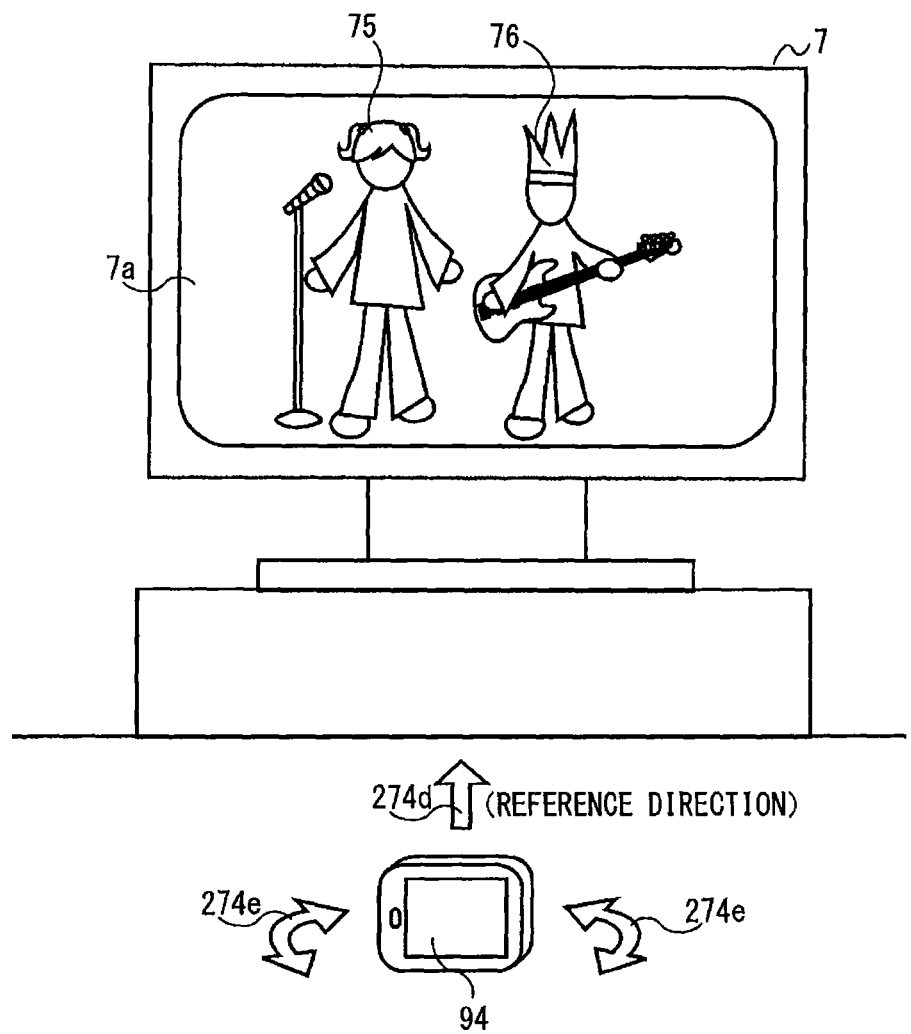
FIG. 26 is a view showing how to manipulate the remote controller shown in FIG. 13.

FIG. 26 is a view showing how to manipulate the remote controller 9 in order to determine the direction of radiation. In FIG. 26, the user 12 holding the remote controller 9 is not shown. Before the reproduction of the music data 71 is started, the user 12 determines a reference direction of the remote controller 9. Specifically, as shown in FIG. 26, the user 12 directs the touch panel display 94 toward the user 12 and directs a rear surface of the remote controller 9 toward the direction of the monitor 7 (indicated by the arrow 274d). The staging content instruction part 95 sets the direction indicated by the arrow 274d as the reference direction of the remote controller 9. The information indicating the reference direction is sent to the main apparatus 6 as the staging instruction information 74. It is assumed that a reference position of the remote controller 9 corresponds to the front row of the audience seats.

The user 12 changes the direction of the remote controller 9 to the directions indicated by the arrows 274e and 274e during the reproduction of the music data 71, to thereby designate the direction of radiation. The staging content instruction part 95 sends the motion information 92A outputted from the sensor part 92 as the staging instruction information 74 to the main apparatus 6 in real time.

The live data generation part 64 determines the direction of radiation on the basis of the reference position and the reference direction of the remote controller 9 and the motion information 92A. The live data generation part 64 generates the video data 274c representing the live place viewed from the reference position toward the direction of radiation. The main apparatus 6 sends the generated video data 274c to the remote controller 9. The video data 274c corresponding to the direction of radiation is generated and sent in real time. The video data 274c representing the live place in the direction of radiation is displayed in the video image display field 274a.

Figure 27:
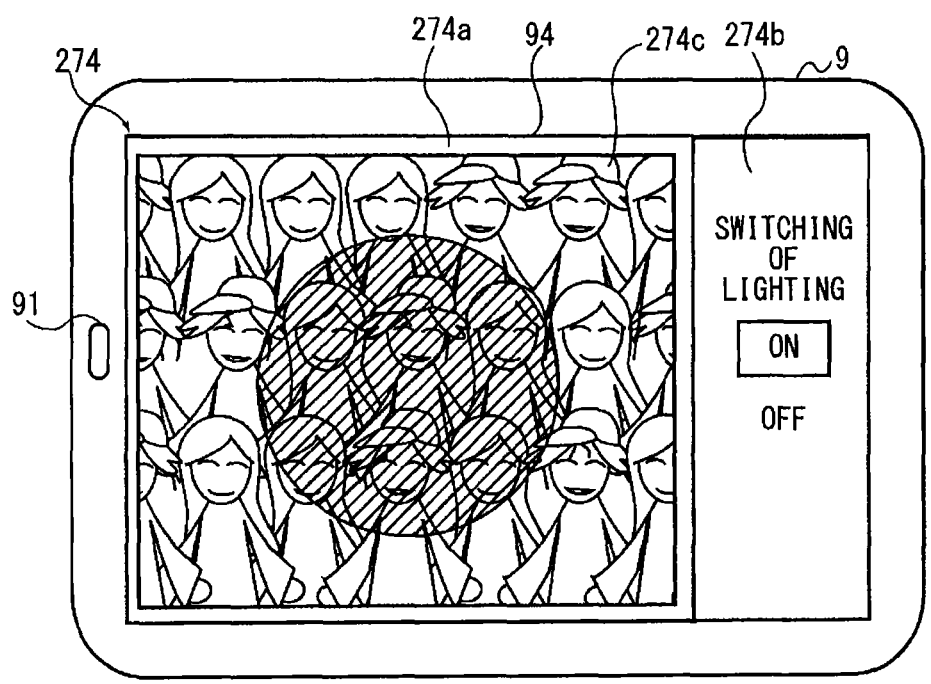
FIG. 27 is a view showing a video image displayed on the remote controller shown in FIG. 13.

FIG. 27 is a view showing the remote controller 9 displaying the video data 274c representing the live place in the direction of radiation. When the user 12 directs the remote controller 9 toward a direction opposite to the reference direction, the direction of radiation is set from the reference position toward a direction of the audience seats. As a result, as shown in FIG. 27, the visitors in the live place are displayed in the video image display field 274a.

On the screen 7a of monitor 7, displayed is a video image of the stage in the live place (see FIG. 14) during the reproduction of the music data 71. Therefore, the users 11 and 12 can liven up the virtual live event while viewing the screen in accordance with the respective roles.

The user 12 touches the button of "ON" in the lighting instruction field 274b in a state where the video image of the visitors is displayed in the video image display field 274a. The staging content instruction part 95 sends the staging instruction information 74 instructing lighting to the main apparatus 6. The live data generation part 64 generates the video data 274c representing a scene in which the spotlight is shined on the audience seats on the basis of the staging instruction information 74 and the direction of radiation. In FIG. 27, a hatched area corresponds to an area on which the spotlight is shined. The live data generation part 64 may generate a video data 274c representing a scene in which the visitors in the hatched area considerably liven up.

The user 12 may move the remote controller 9 in a state where the button of "ON" continues to be selected. In this case, the area on which the spotlight is shined can be moved in the live place. By shining the spotlight on the visitors during the reproduction of the interlude of the music data 71 or the like, for example, the user 12 can liven up the live event.

When the user 12 directs the remote controller 9 toward the direction of the stage, the spotlight can be shined on the vocal 75 and the guitarist 76. When the live data generation part 64 judges that the direction of radiation is the direction of the stage, the live data generation part 64 generates the live data 73 including a video image representing a scene in which the spotlight is shined on the stage. In this case, the video image representing the scene in which the spotlight is shined on the stage is displayed on the screen 7a of the monitor 7.

The staging evaluation part 66 evaluates the staging of lighting even when the lighting position is indicated by moving the remote controller 9. As discussed above, when the spotlight is shined on the guitarist 76 while the solo performance of the guitar is made, the staging evaluation part 66 gives a high score to the staging of lighting. Further, when the spotlight is shined on the visitors while the interlude of the music data 71 is reproduced, the staging evaluation part 66 gives a high score to the staging of lighting.

{Variations}

In the second preferred embodiment, the case where the user 11 sings a song while holding the microphone 8 as the performance of the user 11 has been discussed. The user 11 may perform any other performances. The user 11 may perform a live performance, for example, by using an electronic musical instrument device communicable with the main apparatus 6.

For example, the user 11 holds an electronic musical instrument device having a guitar-like shape and performs an action of plucking strings of the electronic musical instrument device. The electronic musical instrument device sends information in accordance with the action (manipulation) of the user to the main apparatus 6. The live data generation part 64 generates the live data 73 including the musical performance sound of the guitar, instead of the voice data 8A. The user 11 can thereby make a performance as a guitarist in the virtual live place.

In the second preferred embodiment, the karaoke system 200 may comprise a plurality of remote controllers 9. Users who manipulate these remote controllers act as directors for the introduction of song, the mixer operation, the setting off of fireworks, and the lighting instruction, respectively. Since a plurality of stagings can be thereby performed concurrently, all members in a group can liven up the virtual live event.

In the second preferred embodiment, the case has been discussed where the live data generation part 64 generates the live data 73 recording the video image and the sound. The live data 73, however, has only to include at least one of the video image and the sound. In a case, for example, where the karaoke system 200 comprises a speaker instead of the monitor 7, the live data generation part 73 generates the live data 73 including only the sound.

While the invention has been shown and described in detail, the foregoing description is in all aspects illustrative and not restrictive. It is therefore understood that numerous modifications and variations can be devised without departing from the scope of the invention.

The invention claimed is:

1. An amusement system, comprising:
   a main apparatus;
   a voice input device held by a user, for outputting voice inputted by the user as voice data; and
   a voice recognition device for performing a voice recognition process on the voice data, to thereby generate phrase information indicating a phrase that the user says, wherein
   the voice input device includes
      a first motion information output part for outputting first motion information indicating a motion of the voice input device, and
   the main apparatus includes
      a reproduction part for reproducing music data selected by the user and audience condition data recording at least one of a video image and sound which indicate the condition of an audience;
      a performance specifying part for specifying a performance of the user on the basis of at least one of the phrase information and the first motion information; and
      a reaction instruction part for determining a reaction level of the audience for the specified performance on the basis of a time difference between a timing when the phrase information is detected and a timing when the first motion information is detected, selecting reproduced reaction data corresponding to the specified performance and the determined reaction level out of a plurality of pieces of reaction data each indicating a reaction of the audience and instructing the reproduction part to reproduce the reproduced reaction data.

2. The amusement system according to claim 1, wherein the reaction instruction part determines a reproduction condition of the reproduced reaction data on the basis of the reaction level of the audience and instructs the reproduction part of the reproduction condition.

3. The amusement system according to claim 1, wherein the reproduction part reproduces the audience condition data corresponding to an audience group set by the user, and
   the reaction instruction part determines the reaction level of the audience on the basis of the audience group.

4. The amusement system according to claim 1, wherein the performance specifying part determines that the user makes a performance for exciting the audience when the performance specifying part determines, on the basis of the phrase information, that the user calls on the audience with a specific phrase in a question form and determines, on the basis of the first motion information, that a direction of the voice input device is reversed, and
   the reaction instruction part selects reaction data recording a video image and sound of the audience who answers the specific phrase in unison, as the reproduced reaction data.

5. The amusement system according to claim 1, wherein the performance specifying part determines that the user makes a performance for requesting the audience to sing along when the performance specifying part determines, on the basis of the phrase information, that the user calls on the audience with a specific phrase requesting the audience to sing along and determines, on the basis of the first motion information, that a direction of the voice input device is reversed, and
   the reaction instruction part selects reaction data recording a video image and sound of the audience who sings along, as the reproduced reaction data.

6. The amusement system according to claim 1, wherein the performance specifying part determines that the user makes a performance for leading the audience to clap when the performance specifying part determines, on the basis of the motion information, that the user claps, and
   the reaction instruction part selects reaction data recording a video image and sound of the audience who claps, as the reproduced reaction data.

7. The amusement system according to claim 1, wherein the performance specifying part determines that the user makes a performance for requesting the audience to wave both arms when the performance specifying part determines, on the basis of the motion information, that the user waves both arms, and
   the reaction instruction part selects reaction data recording a video image and sound of the audience who waves both arms, as the reproduced reaction data.

8. The amusement system according to claim 1, further comprising:
   a controller held by the user in one hand, with the other hand holding the voice input device,
   wherein the controller includes
      a second motion information output part for outputting second motion information indicating a motion of the controller, and
      the performance specifying part specifies a performance of the user on the basis of the second motion information.

9. The amusement system according to claim 1, wherein the reaction instruction part scores each of performances made in a first part of the music data on the basis of the reaction level of the audience for the performance, and scores each of performances made in a second part of the music data on the basis of the reaction level of the audience for the performance.

10. A voice input device used in the amusement system as defined in claim 1.

11. An amusement system, comprising:
    a main apparatus;
    a voice input device held by a user, for outputting voice inputted by the user as voice data;
    an image pickup device for picking up an image of the user to output video data; and
    a voice recognition device for performing a voice recognition process on the voice data, to thereby generate phrase information indicating a phrase that the user says, wherein
    the main apparatus includes
       a reproduction part for reproducing music data selected by the user and audience condition data recording at least one of a video image and sound which indicate the condition of an audience;
a video analysis part for analyzing the video data to generate first motion information indicating a motion of the user;
a performance specifying part for specifying a performance of the user on the basis of at least one of the phrase information and the first motion information; and
a reaction instruction part for determining a reaction level of the audience for the specified performance on the basis of a time difference between a timing when the phrase information is detected and a timing when the first motion information is detected, selecting reproduced reaction data corresponding to the specified performance and the determined reaction level out of a plurality of pieces of reaction data each indicating a reaction of the audience and instructing the reproduction part to reproduce the reproduced reaction data.

12. The amusement system according to claim 11, wherein
the reaction instruction part determines a reproduction condition of the reproduced reaction data on the basis of the reaction level of the audience and instructs the reproduction part of the reproduction condition.

13. The amusement system according to claim 11, wherein
the reproduction part reproduces the audience condition data corresponding to an audience group set by the user, and
the reaction instruction part determines the reaction level of the audience on the basis of the audience group.

14. The amusement system according to claim 11, wherein
the performance specifying part determines that the user makes a performance for exciting the audience when the performance specifying part determines, on the basis of the phrase information, that the user calls on the audience with a specific phrase in a question form and determines, on the basis of the first motion information, that a direction of the voice input device is reversed, and
the reaction instruction part selects reaction data recording a video image and sound of the audience who answers the specific phrase in unison, as the reproduced reaction data.

15. The amusement system according to claim 11, wherein
the performance specifying part determines that the user makes a performance for requesting the audience to sing along when the performance specifying part determines, on the basis of the phrase information, that the user calls on the audience with a specific phrase requesting the audience to sing along and determines, on the basis of the first motion information, that a direction of the voice input device is reversed, and
the reaction instruction part selects reaction data recording a video image and sound of the audience who sings along, as the reproduced reaction data.

16. The amusement system according to claim 11, wherein
the performance specifying part determines that the user makes a performance for leading the audience to clap when the performance specifying part determines, on the basis of the motion information, that the user claps, and
the reaction instruction part selects reaction data recording a video image and sound of the audience who claps, as the reproduced reaction data.

17. The amusement system according to claim 11, wherein
the performance specifying part determines that the user makes a performance for requesting the audience to wave both arms when the performance specifying part determines, on the basis of the motion information, that the user waves both arms, and
the reaction instruction part selects reaction data recording a video image and sound of the audience who waves both arms, as the reproduced reaction data.

18. The amusement system according to claim 11, wherein
the reaction instruction part scores each of performances made in a first part of the music data on the basis of the reaction level of the audience for the performance, and scores each of performances made in a second part of the music data on the basis of the reaction level of the audience for the performance.

19. A voice input device used in the amusement system as defined in claim 11.

20. A non-transitory computer readable medium having a program used in an amusement system comprising: a main apparatus; a voice input device held by a user, for outputting voice inputted by the user as voice data and outputting first motion information indicating a motion of the voice input device; and a voice recognition device for performing a voice recognition process on the voice data, to thereby generate phrase information indicating a phrase that the user says, the program executed by a computer incorporated in the main apparatus to cause the computer to perform a method, the method comprising:
reproducing music data selected by the user and audience condition data recording at least one of a video image and sound which indicate the condition of an audience;
specifying a performance of the user on the basis of at least one of the phrase information and the first motion information;
determining a reaction level of the audience for the specified performance on the basis of a time difference between a timing when the phrase information is detected and a timing when the first motion information is detected; and
selecting reproduced reaction data corresponding to the specified performance and the determined reaction level out of a plurality of pieces of reaction data each indicating a reaction of the audience and instructing reproduction of the reproduced reaction data.

21. A non-transitory computer readable medium having a program used in an amusement system comprising: a main apparatus; a voice input device held by a user, for outputting voice inputted by the user as voice data; an image pickup device for picking up an image of the user to output video data; and a voice recognition device for performing a voice recognition process on the voice data, to thereby generate phrase information indicating a phrase that the user says, the program executed by a computer incorporated in the main apparatus to cause the computer to perform a method, the method comprising:
reproducing music data selected by the user and audience condition data recording at least one of a video image and sound which indicate the condition of an audience;
analyzing the video data to generate first motion information indicating a motion of the user;

specifying a performance of the user on the basis of at least one of the phrase information and the first motion information;

determining a reaction level of the audience for the specified performance on the basis of a time difference between a timing when the phrase information is detected and a timing when the first motion information is detected; and selecting reproduced reaction data corresponding to the specified performance and the determined reaction level out of a plurality of pieces of reaction data each indicating a reaction of the audience and instructing reproduction of the reproduced reaction data.

* * * * *